(12) United States Patent
Yokota

(10) Patent No.: US 8,151,275 B2
(45) Date of Patent: Apr. 3, 2012

(54) ACCESSING COPY INFORMATION OF MMIO REGISTER BY GUEST OS IN BOTH ACTIVE AND INACTIVE STATE OF A DESIGNATED LOGICAL PROCESSOR CORRESPONDING TO THE GUEST OS

(75) Inventor: Daisuke Yokota, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1696 days.

(21) Appl. No.: 11/451,611

(22) Filed: Jun. 12, 2006

(65) Prior Publication Data
US 2006/0282624 A1 Dec. 14, 2006

(30) Foreign Application Priority Data
Jun. 14, 2005 (JP) .................. 2005-173808

(51) Int. Cl.
G06F 9/46 (2006.01)
G06F 9/34 (2006.01)

(52) U.S. Cl. ........ 718/108; 718/100; 718/102; 711/202; 711/203

(58) Field of Classification Search .................. None
See application file for complete search history.

(56) References Cited

U.S. PATENT DOCUMENTS

| | | | | |
|---|---|---|---|---|
| 7,051,222 B2 * | 5/2006 | Wyatt et al. | ................... | 713/323 |
| 7,093,080 B2 * | 8/2006 | Day et al. | ..................... | 711/141 |
| 7,356,625 B2 * | 4/2008 | Arndt et al. | ..................... | 710/52 |
| 7,418,541 B2 * | 8/2008 | Fields et al. | .................. | 711/100 |
| 7,426,728 B2 * | 9/2008 | Ruemmler et al. | ........... | 718/100 |
| 7,725,895 B2 * | 5/2010 | Galal et al. | ..................... | 718/100 |
| 7,788,669 B2 * | 8/2010 | England et al. | ............... | 718/104 |
| 2006/0179255 A1 * | 8/2006 | Yamazaki | ..................... | 711/147 |

FOREIGN PATENT DOCUMENTS

| | | |
|---|---|---|
| JP | 2003-345612 | 12/2003 |
| JP | 2005-122640 | * 5/2005 |

OTHER PUBLICATIONS

Notification of Reason(s) for Refusal, dated Dec. 16, 2008, for corresponding Japanese Patent Application 2005-173808.

* cited by examiner

Primary Examiner — Meng An
Assistant Examiner — Caroline H Arcos
(74) Attorney, Agent, or Firm — Katten Muchin Rosenman LLP

(57) ABSTRACT

A method and an apparatus for storing a copy of memory-mapped I/O (MMIO) register are provided for enhancing data processing efficiency. In a structure in which data processing is executed by associating a plurality of logical processors with a physical processor by timing sharing, a host OS stores copy information, namely, shadow, of the MMIO register corresponding to a logical processor in memory both in an active state where a physical processor is allocated to a logical processor corresponding to a guest OS and in an inactive state where no physical processor is allocated to a logical processor. This structure enables a guest OS to gain faster access to the MMIO register through the shadow by memory access, instead of a direct access to the MMIO register, so as to achieve efficient data processing.

11 Claims, 16 Drawing Sheets

ACCESSING COPY INFORMATION OF MMIO REGISTER BY GUEST OS IN BOTH ACTIVE AND INACTIVE STATE OF A DESIGNATED LOGICAL PROCESSOR CORRESPONDING TO THE GUEST OS

BACKGROUND OF THE INVENTION

1. Field of the Invention

The present invention relates to an information processing apparatus, a process control method and a computer program, and it particularly relates to an information processing apparatus, a process control method and a computer program by which to improve accessibility to a resource for logical processors in a structure where various data processings are carried out in a manner that a plurality of logical processors share the resources available in the information processing apparatus.

2. Description of the Related Art

In a multi-OS system having a plurality of operating systems (OSs) running within the single system, different processes can be executed by the respective OSs, in which processings are done by switching time-sequentially the use of hardware, such a CPU, a memory and the like, common to the system.

Scheduling of processes (tasks) to be executed respectively by a plurality of OSs is carried out, for instance, by partition management software. For example, if there are two operating systems, OS(α) and OS(β), coexisting in a system and a process of OS(α) is set as a partition A and a process of OS(β) as a partition B, then the partition management software determines an execution schedule of the partition A and the partition B and executes the processes of the OSs by assigning hardware resources according to the determined schedule.

A known technology concerning task management in a multi-OS system is introduced by Reference (1) in the following Related Art List. Reference (1) discloses a task scheduling technique for preferentially executing processes with higher emergency In task management carried out at each of a plurality of OSs.

As mentioned above, subjects of various data processings are set as partitions. More specifically, logical partitions are set as subjects that receive allocation of resources within the system, and various resources, including usable time for physical processor units, virtual address space and memory space, are allocated to the logical partitions so that the processes using the allocated resources may be executed. For each of the logical partitions, a logical processor corresponding to any of physical processors is set, and a data processing according to the logical processor is carried out. It is to be noted that there is not always a one-to-one correspondence between logical processors and physical processors; there may be cases where a plurality of physical processors are associated with a single logical processor or where a single physical processor is associated with a plurality of logical processors.

When a plurality of processings using logical processors are executed in parallel, the physical processors are used by the plurality of logical processors according to a scheduling. That is, the plurality of logical processors use the physical processors by time sharing.

Now let us consider a system comprising a main processor and a plurality of sub-processors.

For example, let us consider an access processing when a single logical sub-processor is allocated to a single physical sub-processor as shown in FIG. 1, or, in particular, an access processing to a logical sub-processor A when the logical sub-processor A uses the physical sub-processor 1 exclusively and the logical sub-processor B uses the physical sub-processor 2 exclusively.

For instance, let us assume that an OS associated with a logical partition to which a logical sub-processor A has been set tries to access the logical sub-processor A. The MMIO (Memory-Napped I/O) register information, local storage area and the like held by a physical processor 1 occupied by the logical sub-processor A are mapped to an address space of a logical partition associated with the logical sub-processor A. The area thus mapped is associated with the exclusively used physical sub-processor 1. Therefore the OS associated with the logical partition can always access the logical sub-processor A. By gaining access to the logical sub-processor A, it is possible to obtain various information, such as local storage information, corresponding to the logical sub-processor A.

Note that the MMIO (Memory-Mapped I/O) is an input/output control mechanism for controlling hardware by memory mapping, which accomplishes hardware control by write processing or read processing using specific memory positions.

On the other hand, let us suppose, for instance, that processings are executed by time sharing with a plurality of logical sub-processors allocated to a single physical sub-processor as shown in FIG. 2. Then, at the timing when a logical sub-processor A is using a physical sub-processor 1 as with access A in FIG. 2, the OS associated with the logical partition can access the logical sub-processor A in the same-way as the aforementioned processing. However, at the timing when a logical sub-processor A is not using a physical sub-processor 1 as with access B in FIG. 2, it is not possible to execute an access to the logical sub-processor A because, at this timing, the logical sub-processor A is not using any physical sub-processor and thus the MMIO (Memory-Mapped I/O) register information, local storage area, and the like for a physical sub-processor are not mapped in an address space of a logical partition associated with the logical sub-processor A. In this case, it is necessitated that the logical sub-processor A remains on standby until the time comes to use a physical sub-processor by time sharing, thus resulting in a problem of delayed data processing.

Related Art List (1) Japanese Patent Application Laid-Open No. 2003-345612.

SUMMARY OF THE INVENTION

The present invention has been made to solve the above-mentioned problem and a general purpose thereof is to provide an information processing apparatus, a process control method and a computer program to realize efficient data processing with improved accessibility to resources for logical processors in a structure where various data processings are carried out with a plurality of logical processors sharing resources within the information processing apparatus.

One embodiment of the present invention relates to an information processing apparatus. This apparatus includes: a control OS execution unit, the control OS performing a processing of associating a plurality of logical processors with a physical processor by time sharing; and a guest OS execution unit, the guest OS being associated with a logical partition and being a subject that uses a logical processor, wherein the guest OS execution unit is configured to execute a data processing such that a memory-mapped I/O (MMIO) register is used in an active state where a physical processor is allocated to a logical processor corresponding to the guest OS, and wherein the control OS execution unit is configured to store in memory copy information of MMIO register corresponding to said logical processor corresponding to the guest OS, both in an active state where a physical processor is allocated to said logical processor and in an inactive state where no physical processor is allocated to said logical processor.

The control OS execution unit may be configured to store in memory a copy of MMIO register information wherein the MMIO register information is not rewritten by the physical processor.

The control OS execution unit may be configured to store in memory a copy of MMIO register information wherein the MMIO register information is not rewritten by the physical processor, and also configured to store in memory a copy of MMIO register information wherein the MMIO register information which has been rewritten is detectable by the control OS.

When the rewrite of MMIO register information is executed by the physical processor, the control OS execution unit may be configured to update the copy information of MMIO register stored in memory in accordance with MMIO register information.

The guest OS execution unit may be configured to access the copy information of MMIO register stored in memory via a guest OS programming interface (GOT) set by the control OS.

The guest OS execution unit may be configured to execute a system call to the control OS upon a request of access to the copy information of MMIO register stored in memory, and the control OS execution unit may be configured to set a guest OS programming Interface (GOI) to an active state for the guest OS.

Another embodiment of the present invention relates to a process control method. This method is a method of controlling a process in an information processing apparatus that executes data processing by associating a plurality of logical processors with a physical processor by time sharing, and the method includes: executing, executed by a control OS, a processing of associating a logical processor corresponding to a guest OS, which is a subject that uses a logical processor, with a physical processor by time sharing; executing a data processing such that a memory-mapped I/O (MMIO) register is used in the guest OS in an active state where a physical processor is allocated to a logical processor corresponding to the guest OS; and executing, executed by the control OS, a processing such that copy information of the MMIO register corresponding to said logical processor corresponding to the guest OS, is stored in memory both in an active state where a physical processor is allocated to said logical processor and in an inactive state where no physical processor is allocated to said logical processor.

Arbitrary combinations of the aforementioned constituting elements, and the implementation of the present invention in the form of a method, an apparatus, a system, a program, a recoding medium and so forth may also be effective as and encompassed by the embodiments of the present invention.

The above and other features and advantages of the present invention will be readily understood from the following detailed description of the invention taken in conjunction with the accompanying drawings.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

With reference to figures, a detailed description will be given hereinbelow of an information processing apparatus, a process control method and a computer program according to the embodiments of the present invention.

Figure 3:
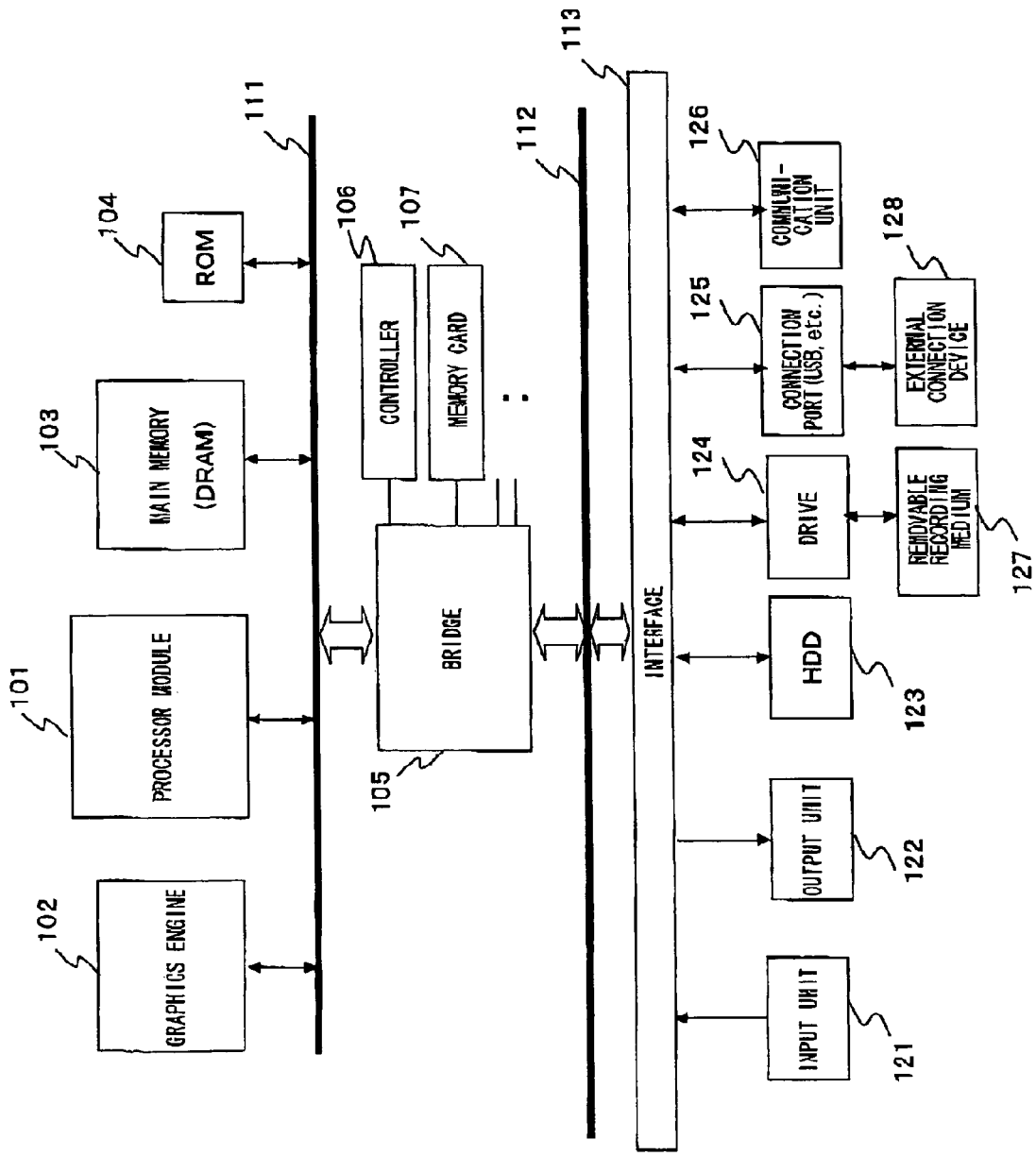
FIG. 3 illustrates an example of a structure of an information processing apparatus according to an embodiment of the present invention.

Referring to FIG. 3, an example of hardware concerning an information processing apparatus according to an embodiment of the present invention will now be described. A processor module 101 is a module comprised of a plurality of processing units, and executes data processings according to various types of programs, including an OS (Operating System) and application programs compatible with an OS, by following instructions from programs stored in a ROM (Read Only Memory) 104, a HDD 123 and the like. The detailed description of the processor module 101 will be given later with reference to FIG. 4.

A graphics engine 102 produces data to be outputted to a display device, constituting an output unit 122, where the data will be displayed. The graphics engine 102 performs a 3-D rendering processing, for example. A main memory 103 such as DRAM stores programs to be executed on the processor module 101, parameters that vary as appropriate in the execution thereof and so forth. These components are mutually connected via a host bus 111 constituted by a CPU bus and the like.

The host bus 111 is connected with an external bus 112, such as a PCI (Peripheral Component Interconnect/Interface) bus, via a bridge 105. The bridge 105 performs a control of data input and output among the host bus 111, the external bus 112, a controller 106, a memory card 107 and the other devices.

An input unit 121 inputs the input information from input devices, such as a keyboard and a pointing device, operated by a user. An output unit 122 is comprised of an image output unit, such as a LCD (Liquid Crystal Device) and a CRT (Cathode Ray Tube), and an audio output unit, such as a speaker.

The HDD (Hard Disk Drive) 123 has a hard disk built-in, drives the hard disk and records or reproduces programs or information executed by the processor module 101.

A drive 124 reads out data or programs recorded in a removable recording medium 127 mounted, such as a magnetic disk, an optical disk, a magneto-optical disk or a semiconductor memory. And the drive 124 supplies the data or programs to a main memory (DRAM) 103 connected via an interface 113, the external bus 112, the bridge 105 and the host bus 111.

A connection port 125 is a port that connects an external connection device 128, and has connectors such as a USB and an IEEE 1394. The connection port 125 is connected with the processor module 101 and the like via the interface 113, the external bus 112, the bridge 105 and the host bus 111. A communication unit 126, which is connected to a network, transmits the data supplied from the processor module 101, the HDD 123 and the like and receives the externally provided data.

Figure 4:
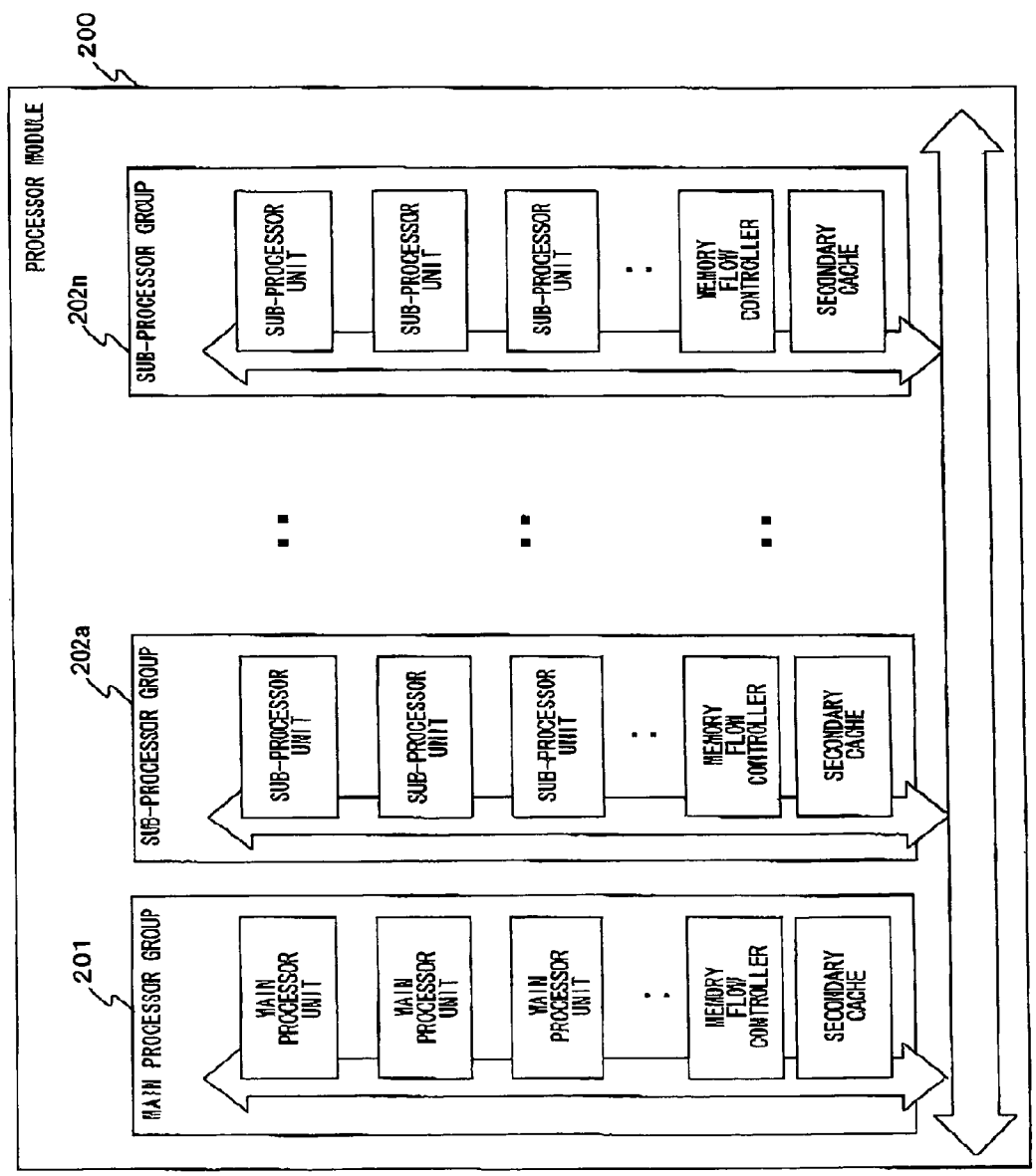
FIG. 4 illustrates an example of a structure of a processor module.

Next, an example of a structure of a processor module will be described with reference to FIG. 4. As shown in FIG. 4, a processor module 200 comprises a main processor group 201 comprised of a plurality of main processors and a plurality of sub-processor groups 202*a* to 202*n* each comprised of a plurality of sub-processors. Each of the main processor groups is provided with a memory controller and a secondary cache, and each of the sub-processor groups is also provided with a memory controller and a secondary cache. Each of the processor groups 201 and 202*a* to 202*n* has eight processor units, for instance, and those processor units are connected by a crossbar architecture or a packet-switching network. One or more of the sub-processors 202*a* to 202*n* are selected based on instructions from the main processors of the main processor group 201 so as to execute a predetermined program.

An apparatus according to an embodiment of the present invention has a plurality of physical sub-processors and the software multiplexes the physical sub-processors by timesharing so as to provide an OS with a logical processor or logical processors. A control OS that controls the sub-processors operates on a main processor. Note that the method implemented in the present invention may be put to practical use even when an apparatus does not have any master-servant relationship as found between a main processor and sub-processors and particularly it may be applicable to a multi-processor machine having no master-servant relationship between the processors. Note also that the control OS will be often called a "host OS" in contrast to a "guest OS" and hence the control OS and the host OS will be used interchangeably in this patent specification.

A memory flow controller placed in each processor group performs the control of data input-output to and from the main memory 103 shown in FIG. 3. The secondary cache is utilized as a storage area for data to be processed in each processor group.

Figure 5:
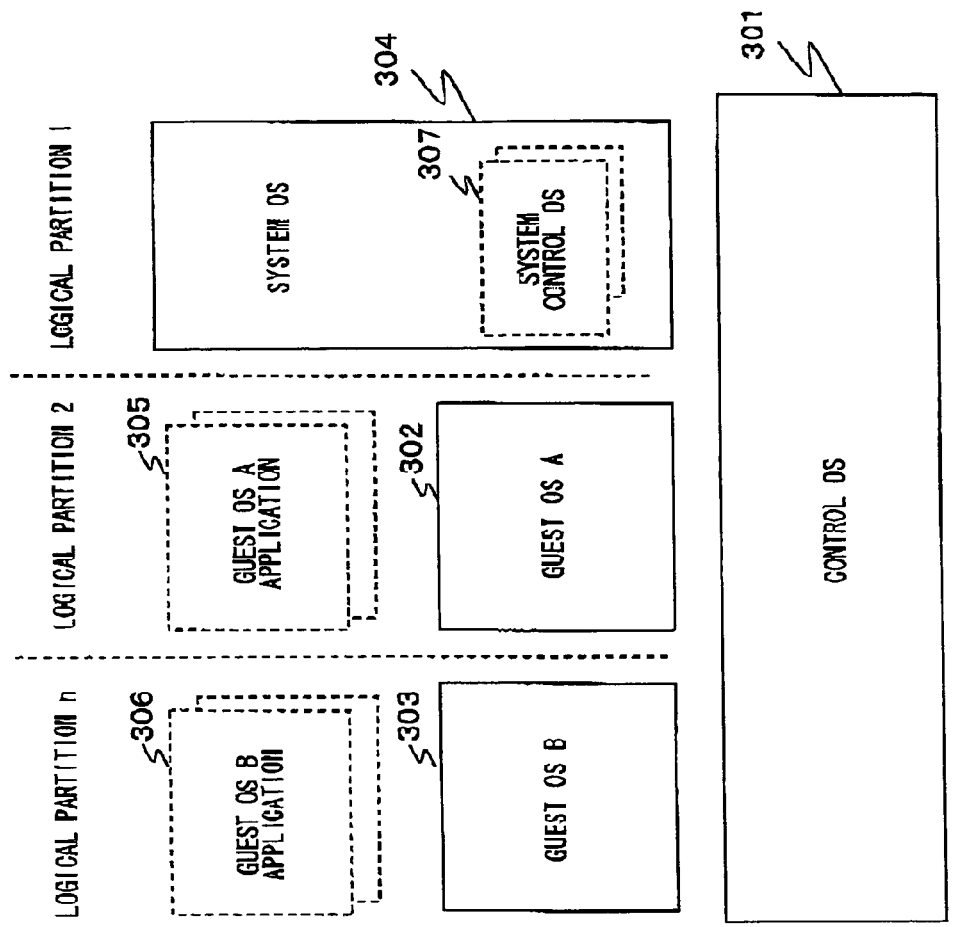
FIG. 5 illustrates a structure of an operating system in an information processing apparatus according to an embodiment of the present invention.

A structure of an operating system (OS) in an information processing apparatus according to an embodiment of the present invention will now be described with reference to FIG. 5. The information processing apparatus according to the present embodiments is of a multi-OS structure such that a plurality of operating systems (OSs) coexist. As shown in FIG. 5, the information processing apparatus has a plurality of operating systems (OSs) of a logical hierarchical structure.

Referring to FIG. 5, a control OS 301 is provided in a lower layer, and a plurality or guest OSs 302 and 303 and a system control OS 304 are set in an upper layer. The control OS 301, together with the system control OS 304, realizes a logical partition serving as an executable unit of each process to be executed in the processor module described with reference to FIG. 3 and FIG. 4, and executes a processing in which the hardware resources (main processors, sub-processors, memories, devices and the like as computer resources) are allocated to each logical partition.

The guest OSs 302 and 303 may be various types of OSs such as a game OS, Windows (registered trademark) and Linus (registered trademark), and operate under the control of the control OS 301. Though two guest OSs, namely, the guest OSs 302 and 303 are shown in FIG. 5, the number of guest OSs may be set arbitrarily.

The guest OSs 302 and 303 operate within the respective logical partitions set by the control OS 301 and the system control OS 304, and execute various types of data processings using the hardware resources, such as main processors, sub-processors, memories and other devices, allocated to the respective logical partitions.

For example, the guest OS A 302 executes an application program 305 compatible with the guest OS A 302 by using the hardware resources, such an main processors, sub-processors, memories and other devices, allocated to a logical partition 2 set by the control OS 301 and the system control OS 304. The guest OS B 303 executes an application program 306 compatible with the guest OS B 303 by using the hardware resources, such as main processors, sub-processors, memories and other devices, allocated to a logical partition n. The control OS 301 provides a guest OS programming interface as an interface necessary for executing a guest OS.

The system control OS 304 activates a system control program 307 that contains logical partition management information and it together with the control OS 301 performs a control of operating a system based on the system control program 307. The system control program 307 is a program that controls a policy of a system by using a system control programming interface. The system control programming interface is supplied from the control OS 301 to the system control OS 304. The system control program 307 plays a role of providing a means required for flexible customization by programs. For example the role includes the setting of the upper limit value in the allocation of resources.

The system control program 307 can control the behavior of a system by use of the system control programming interface. For example, a logical partition can be created anew and then a new guest OS can be started in this logical partition. In a system where a plurality of OSs are running. Such guest OSs will be activated in the order in which they are programmed beforehand in the system control program. Further, the request for resource allocation submitted from a guest OS can be checked before it is received by the control OS 301, or it can be corrected according to the policy of a system or simply rejected. As a result, the case where the resource is occupied by particular guest OSs alone can be eliminated. Accordingly, the system control program is one that realizes the policy of a system as a program The control OS 301 assigns a logical partition (logical partition 1 in FIG. 5) special for the system control OS 304. The control OS 301 operates in a hypervisor mode. A guest OS operates in a supervisor mode. The system control OS and application programs operate in a problem mode (user mode). Note that the hypervisor is a privilege layer positioned between the logical partition and the hardware.

A logical partition is a subject that receives the assignment of resources in a system. For example, a main memory 103 (see FIG. 3) is divided into a number of regions, and the right to use each of the regions is given as appropriate to logical partitions. The types of resources that are allocated to logical partitions are as follows:

a) Physical processor unit operating time
b) virtual address space
c) Memory accessible by program running in logical partition
d) memory used by control OS to manage logical partition
e) Event port
f) Right to use device
g) Cache partition
h) Right to use bus As already described, a guest OS runs within a logical partition. A guest OS carries out various data processings by monopolizing resources assigned to the logical partition. In many cases, a single logical partition is prepared for each of the individual guest OSs running on a system. And a unique identifier is given to each logical partition. A system control OS 304 performs its management by associating an identifier with a system control program generated as logical partition management information.

A logical partition is generated by a control OS 301 and a system control OS 304. A logical partition immediately after it is generated has no resources and no setting of limitations on usable resources. A logical partition has two states, namely, an active state and a terminated state. A logical partition immediately after it is generated is in an active state. Prompted by a request from a guest OS operating within a logical partition, the logical partition shifts into a terminated state, whereupon all the logical processors assigned to the logical partition come to a stop.

The logical processor is one assigned to a logical partition and is associated with a physical processor which is one processor in the processor groups shown in FIG. 4. Note that there is not always a one-to-one correspondence between logical processors and physical processors; there may be cases where a plurality of physical processors are associated with a single logical processor or where a single physical processor is associated with a plurality of logical processors. The association between logical processors and physical processors is determined by the control OS 301.

The control OS 301 is provided with a function to limit the amounts of resources to be used by respective logical partitions. It is possible to limit the amounts of use of resources that can be assigned/released without the guest OS 302 or 303 communicating with the system control OS 304.

Each logical partition is provided with a control signal port. This port receives a variety of control signals necessary for data exchange/sharing between logical partitions. Listed below are some examples of control signals:

a) Request for connection of event ports between logical partitions
b) Request for connection of a message channel between logical partitions
c) Request for connection to a shared memory area Control signals arriving at each logical partition are queued at the control signal port. The depth of queuing has no limit so long as the memory resource permits. The memory resource necessary for queuing is secured by the logical partition that has sent the control signals. To retrieve control signals from this port, a guest OS programming interface is called. When a control signal has arrived at an empty control signal port, it is possible to transmit an event to an arbitrary event port. An event port may be specified by calling a guest OS programming interface.

A control OS gives logical sub-processors, which are the abstraction of physical sub-processors, as resources (computer resources) to logical partitions. As already mentioned, there is no one-to-one correspondence between physical sub-processors and logical sub-processors, and moreover it is not necessary that they are equal in number. To realize such a configuration, a control OS is capable of associating a single physical sub-processor with a plurality of logical sub-processors according as the necessity arises.

When the number of logical sub-processors is larger than that of physical sub-processors, the control OS processes the physical sub-processors by time sharing. Accordingly, it is possible that the logical sub-processors repeat the suspension and resumption of operation with the passage of time. And the guest OS can monitor these condition changes.

Figure 6:
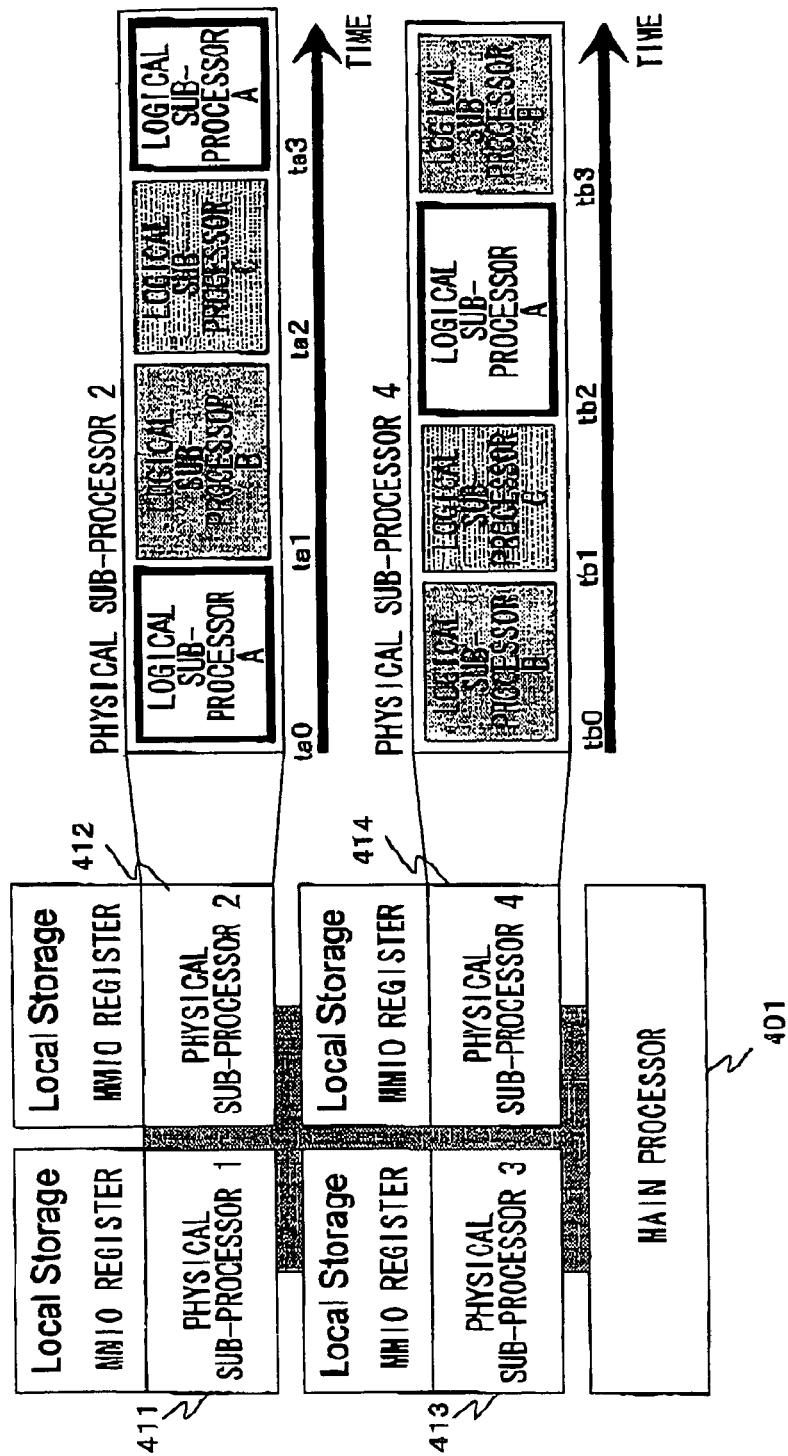
FIG. 6 illustrates how a logical processor is associated with a physical processor.

A description is now given of the correspondence between physical processors and logical processors by referring to FIG. 6. FIG. 6 shows not only a main processor 401 and a physical processor structure of physical sub-processors 411 to 414 but also a time sequence of logical sub-processors operated by the time-sharing processing of two physical sub-processors that are physical sub-processor 2 and physical sub-processor 4.

In the example of FIG. 6, the physical sub-processor 2 is assigned each of the following logical sub-processors by the time sharing wherein Time ta0 to ta1: logical sub-processor A,
Time ta1 to ta2: logical sub-processor B,
Time ta2 to ta3: logical sub-processor C,
Time ta3 to - : logical sub-processor A.

And, for each time duration allocated as above, each logical sub-processor executes a processing by use of the physical sub-processor 2.

Also, the physical sub-processor 4 is assigned each of the following logical sub-processors by the time sharing wherein Time tb0 to tb1: logical sub-processor B,
Time tb1 to tb2: logical sub-processor C,
Time tb2 to tb3: logical sub-processor A,
Time tb3 to - : logical sub-processor B.

And, for each time duration allocated as above, each logical sub-processor executes a processing by use of the physical sub-processor 4.

It is necessary that state information on hardware state and the like at the interruption of data processing be retained if each logical sub-processor is to execute processing using physical sub-processors by time sharing and further to resume data processing using physical sub-processors in the next assigned duration. The state information includes local storage information and MMIO (Memory-Mapped I/O) register information that are associated with the physical sub-processors shown in FIG. 6. MMIO (Memory-Mapped I/O) is an input/output control mechanism for controlling hardware by memory mapping, which accomplishes hardware control by write processing or read processing using specific memory positions.

In the period when a logical sub-processor is assigned to a physical sub-processor, the MMIO area and local storage area of the physical sub-processor reflecting the state of the logical sub-processor are mapped in the area in the logical partition address space corresponding to the logical sub-processor During this time, a guest OS can operate the logical sub-processor by directly accessing the MMIO register and local storage mapped in the logical partition address space.

Figure 7:
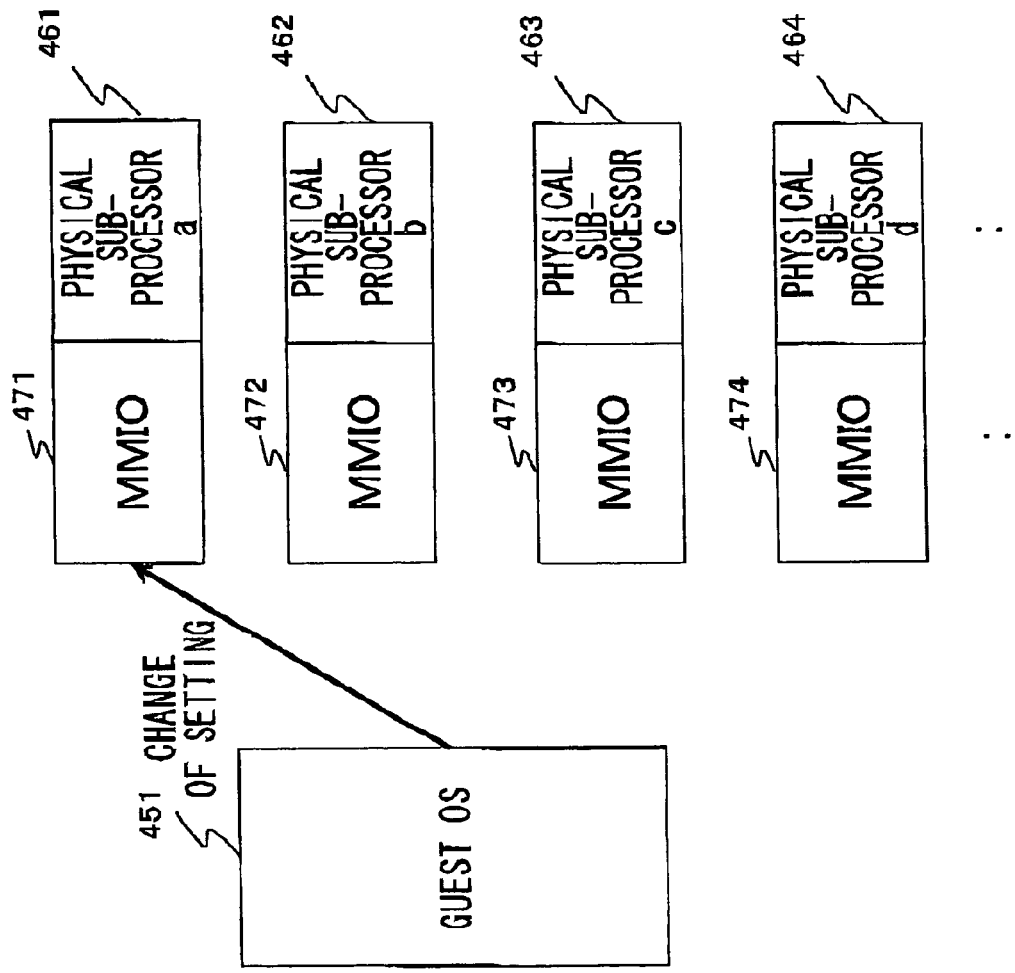
FIG. 7 illustrates an MMIO access processing by a guest OS.

A description is now given of an example of access processing by a guest OS, for which a logical partition is set, using MMIO registers corresponding to the respective physical processors. As shown in FIG. 7, a guest OS 451, for which a logical partition is set, carries out a memory mapping via the respective physical processors 461 to 464 by referring to the MMIO (Memory-Mapped I/O) register information 471 to 474 corresponding to the physical processors 461 to 464 and accomplishes access to hardware by write processing or read processing using specific memory positions.

Figure 1:
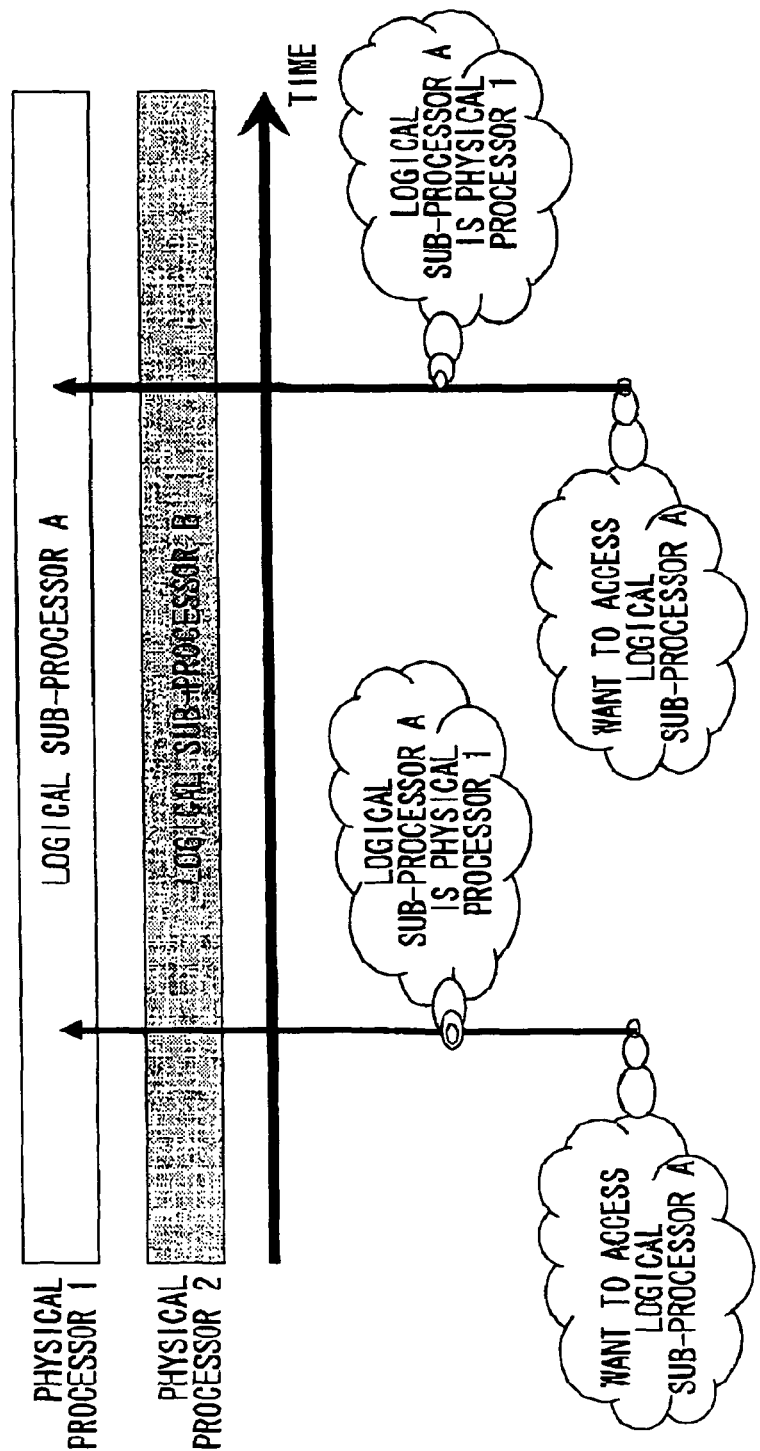
FIG. 1 illustrates an access processing to a logical processor when the logical processor exclusively uses a physical processor.
Figure 2:
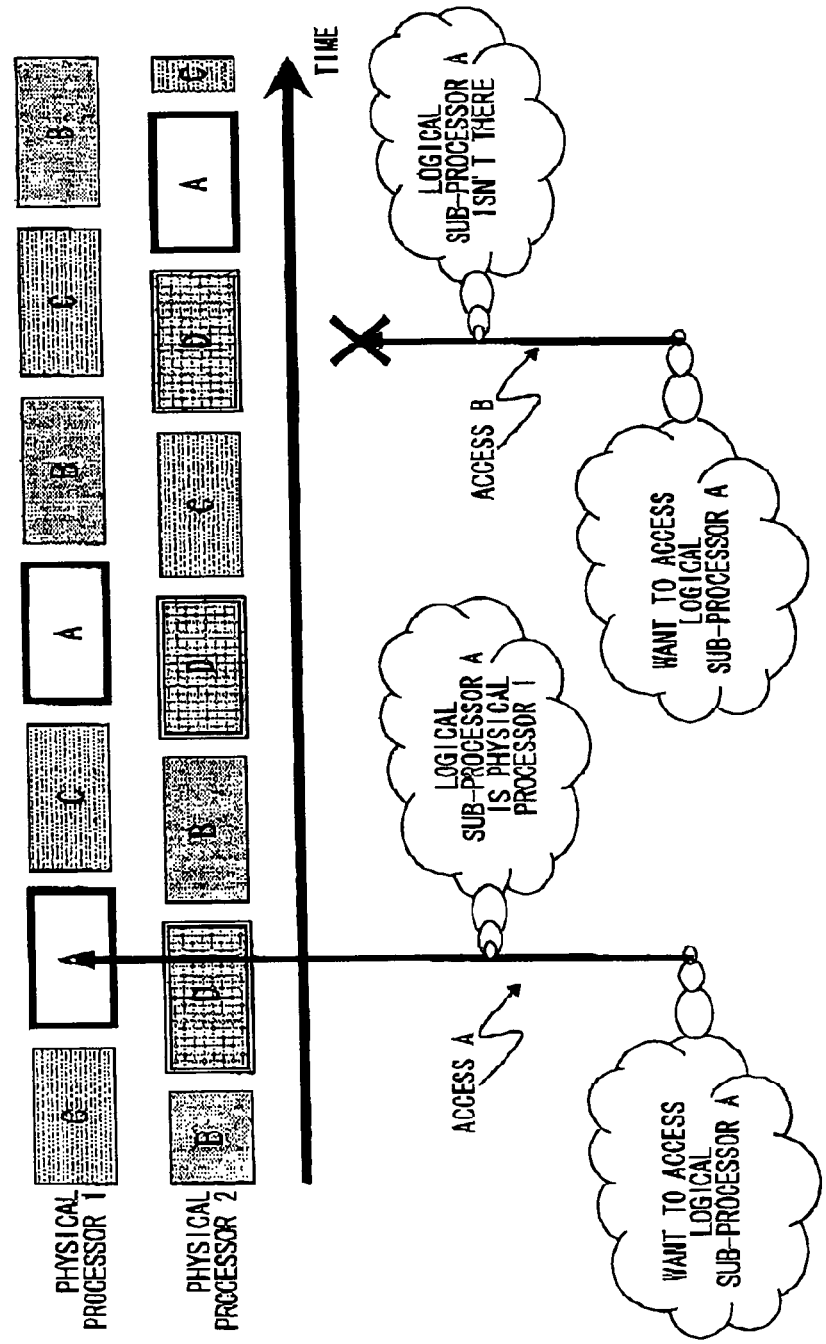
FIG. 2 illustrates a processing to associate a logical processor with a physical processor by time sharing.

Nevertheless, in the period when a logical sub-processor is not assigned to a physical sub-processor, the MMIO register and local storage area, which are a part of the area of the I/O port of the physical sub-processor reflecting the state of the logical sub-processor, are not mapped in the area in the logical partition address space corresponding to the logical sub-processor, and thus access cannot generally be made as already explained by referring to FIG. 2. However, according to the configuration of the present invention, which realizes access to the logical processor during the time when the logical processor is not using the physical processor, a context table including the MMIO register area and local storage area information is so maintained that it can be referred to by other processors. Moreover, as will be described later, whether during the time when the logical processor is using the physical processor or during the time when it is not, it is possible that a "shadow", which is the copy information of the MMIO register information, is stored in main memory to realize access to the MMIO register efficiently.

The following is an explanation of a context storage configuration. In it, data processing using logical sub-processors is executed by a logical partition assigned to a guest as, which was explained by referring to FIG. 5. The assignment of physical processors by time sharing to logical sub-processors corresponding to a logical partition is executed by a control OS.

The logical sub-processors have the active state and inactive state that are controlled by a guest OS and the running state and runnable state that are controlled by a control OS. Thus, there are the following three states for the logical sub-processors, depending on the combination thereof:
(a) Active state and runnable state
(b) Active state and running state
(c) Inactive state The difference between the active state and the inactive state lies in whether the logical sub-processors are the object of tire sharing by the control OS, that is, the object of assignment of physical sub-processors. The active state is a state in which the logical sub-processors are the object of time sharing, that is, the object of assignment of physical sub-processors. When a logical sub-processor is in an active state, the control OS assigns a time-shared physical sub-processor to the sub-processor as appropriate.

The inactive state is a state in which the logical sub-processors are not the object of time sharing. When a logical sub-processor is in an inactive state, the control OS does not assign any time-shared physical sub-processors to the logical sub-processor. In this case, however, the context of the logical sub-processors is held in a context table. The mapping of this context in a logical partition address space by the control OS makes it possible for other processors to access the logical processors in the inactive, state. Note here that the guest OS can control the active state and the inactive state of logical sub-processors.

The difference between the running state and the runnable state lies in whether the logical sub-processors in an active state are being actually executed by the physical sub-processors or not When the number of sub-processors is larger than that of physical processors, the logical sub-processors are realized by physical sub-processors which are time-shared, as already explained by referring to FIG. 2. Therefore, when there are more logical sub-processors than physical sub-processors, it is not always the case that the logical sub-processors are executed by the physical sub-processors. The running state is a state of a moment when a logical sub-processor is being actually executed by a physical sub-processor.

The runnable state, on the other hand, is a state of a moment when a logical sub-processor is the object of assignment of a physical processor (active state) but is not being actually executed by a physical sub-processor.

Transition between these states, namely, transition between the running state and the runnable state, is realized by a context switch of a logical sub-processor, which is turned on by the control OS. Note here that the guest OS can detect the running state and the runnable state of logical sub-processors.

When a logical sub-processor is in an active state and also in a running state, the MMIO register information and local storage area information of the physical sub-processor reflecting the state of the logical sub-processor are mapped in an area in the logical partition address space. In this state, access to the logical sub-processor is possible.

When a logical sub-processor shifts to an inactive state, the control OS stores the context of the logical sub-processor as the state information on the logical sub-processor and maps the content table in an area in the logical partition address space of the guest OS corresponding to the logical sub-processor. As a result of this processing, the guest OS can refer to the resource information of the context table of the logical sub-processor in the inactive state from its own logical partition address space, so that it can now perform such processings as reading, writing and updating of the resource information.

Furthermore, the context table is so structured as to store not only the content of register but also such information as the content of local storage and MMIO register information, which are not contained in a conventional context table. Consequently, the guest OS is now capable of executing data processings through resource access based on these various state information related to a logical processor set in an inactive state where the physical processor is not being used, and this structure enhances the efficiency of data processing.

Figure 8:
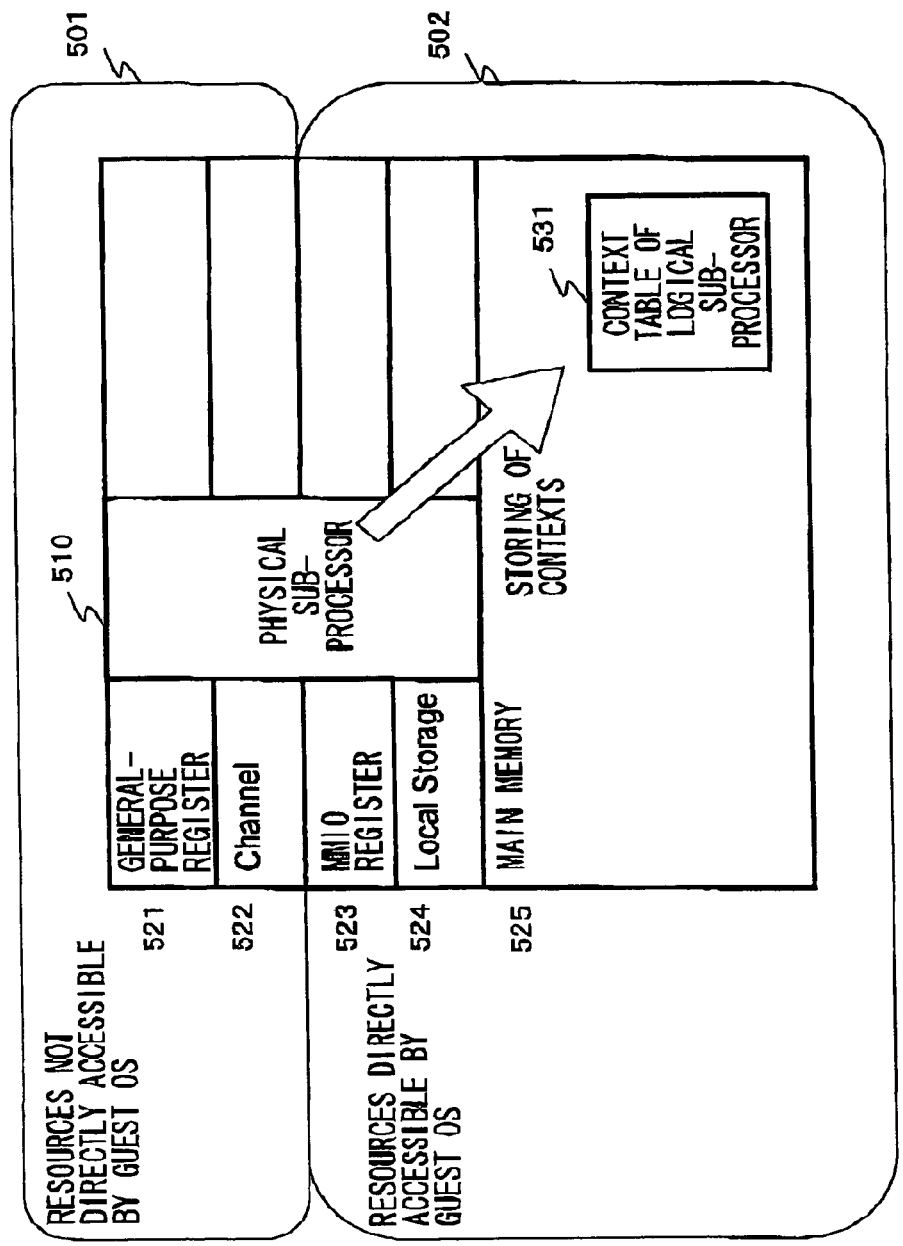
FIG. 8 illustrates an area which can be referred to by a guest OS and an example of setting a context table.

By referring to FIG. 8, a description is given of how a guest OS accesses resources associated with the logical sub-processors. A logical partition is set for a guest OS, and the logical partition is associated with logical sub-processors. Resources are divided into guest OS inaccessible resources 501 and guest OS accessible resources 502.

When the logical sub-processor associated with the logical partition corresponding to the guest OS is in an active state and also in a running state, data processing by the physical sub-processors 510 is being executed. In this state, data processing is carried out by making use of a general-purpose register 521 and part of I/O ports 522, which are included in the guest OS inaccessible resources 501, and an MMIO register 523, local storage 524 and main memory 525, which are included in the guest OS accessible resources 502.

When the physical sub-processor is executing data processing, the MMIO register area 523, the local storage area 524 and the like are mapped in the logical partition address space of the guest OS, so that the guest OS can access these resources.

On the other hand, when the logical sub-processor is in an inactive state, that is, when it is no longer the object of assignment of the physical sub-processors, the context is stored in the context table 531 in the main memory 525 of the logical sub-processors.

The context table 531 of the logical sub-processor to be stored in the main memory 525 is mapped in an area in the logical partition address space of the guest OS corresponding to the logical sub-processors, so that it can be accessed by the guest OS.

Figure 9:
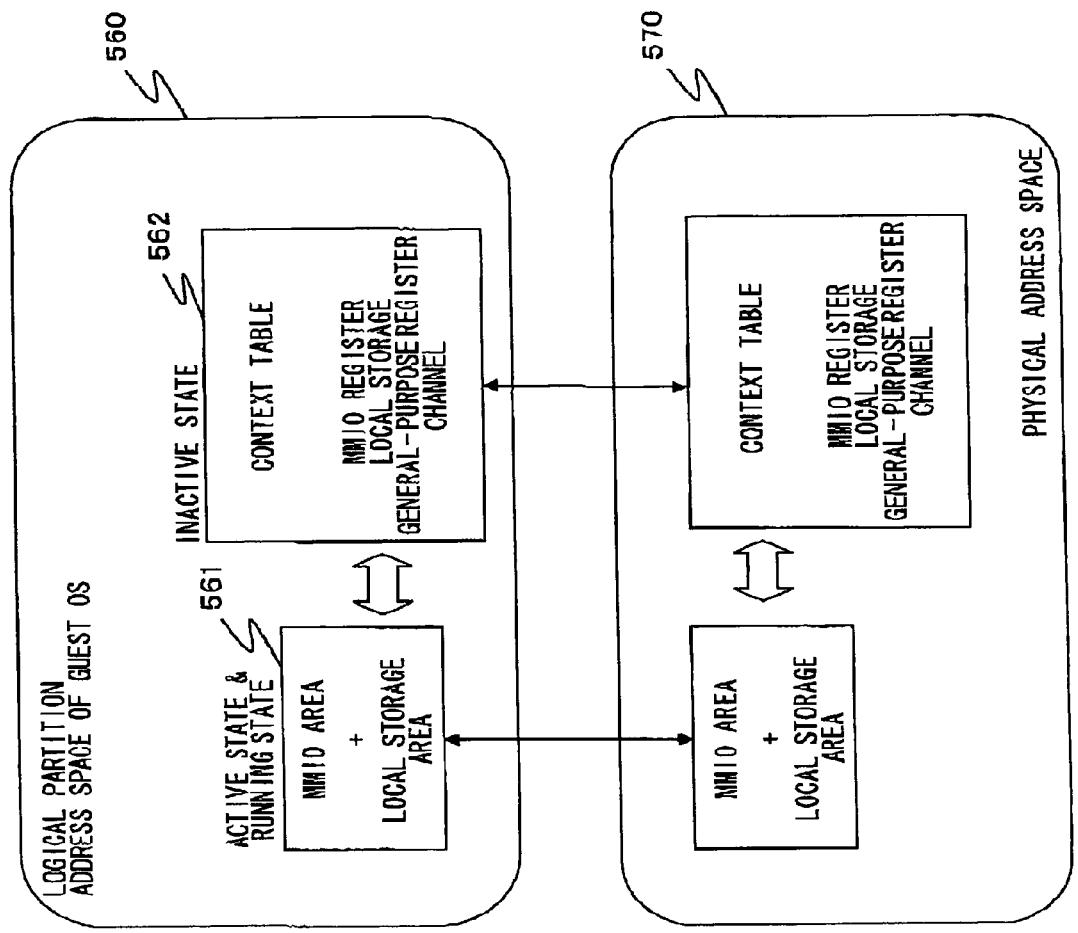
FIG. 9 illustrates a logical partition address space associated with a guest OS and information which can be referred to a guest OS.

By referring to FIG. 9, a description is given of the correspondence between the logical partition address space of a guest OS corresponding to a logical sub-processor and the physical address space.

FIG. 9 shows a logical partition address space 560 of a guest OS corresponding to a logical sub-processor and a physical address space 570. The physical address space 570 is a physical space including memory, MMIO register, and local storage of a physical sub-processor A control OS maps part of the physical address space 570 in the logical address space according as the necessity arises. The guest OS can only access the physical address space mapped in the logical partition address space area.

When the logical sub-processor associated with a logical partition corresponding to the guest OS is in an active state and also in a running state, that is, when data processing is being executed by a physical sub-processor, part of the MMIO register and the local storage area 561 are mapped in the logical partition address space 560 of the guest OS, so that the guest OS can access these resources.

On the other hand, when the logical sub-processor associated with a logical partition corresponding to the guest OS is in an inactive state, that in, when it is no longer the object of assignment of the physical sub-processors, a context table 562, including part of the MMIO register, the local storage area and the like, is mapped in the logical partition address space 560 of the guest OS, so that the guest OS can access these resources.

Figure 10:
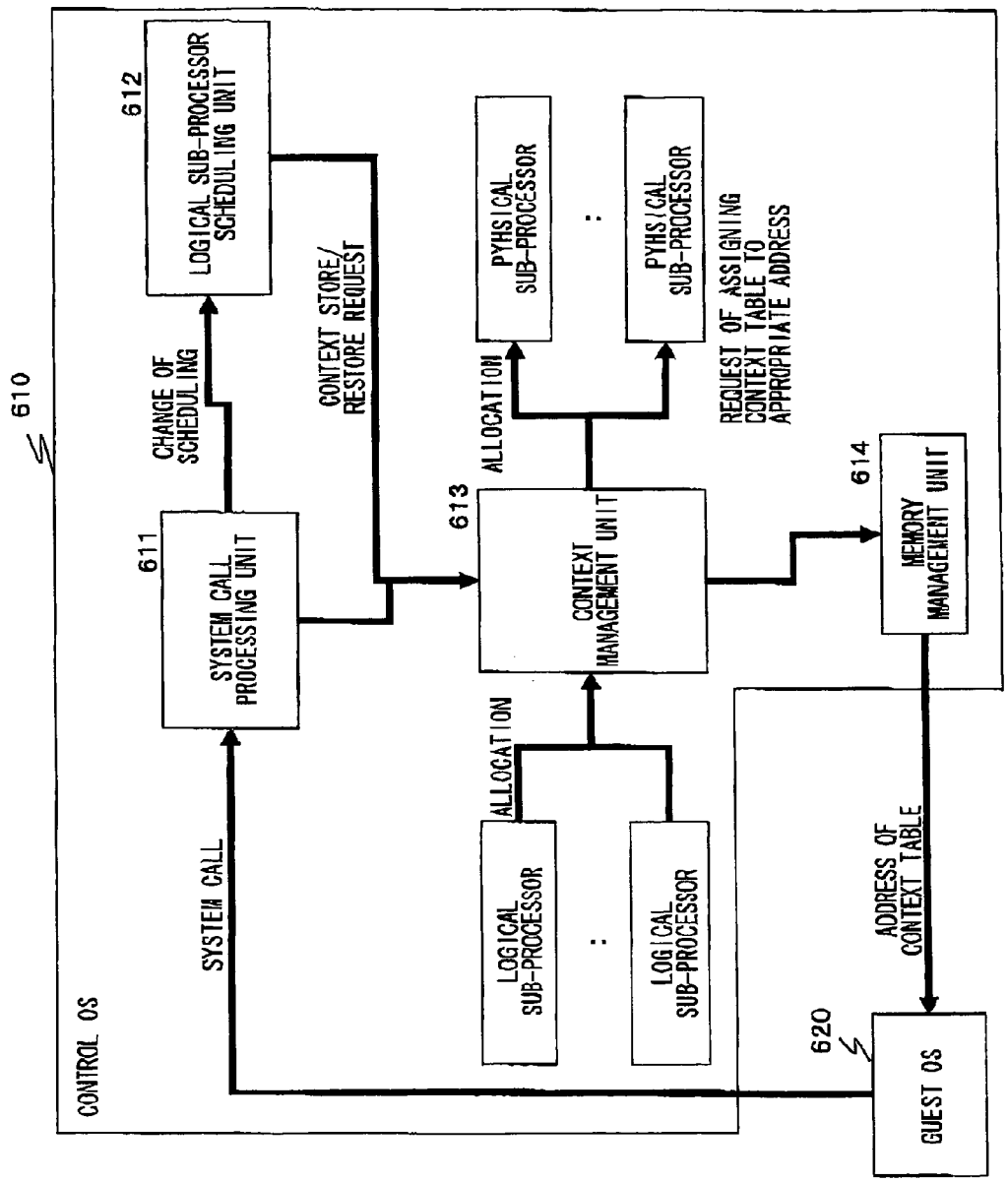
FIG. 10 illustrates processings executed by a guest OS and a control OS.

Referring to FIG. 10, a detailed description is given of a context save processing. FIG. 10 illustrates a control OS 610 that executes a context save processing and an guest OS 620 in which a logical partition executing a data processing by use of a logical processor associated with a context to be stored is set.

As was explained with reference to FIG. 9, that the context is stored in a state which can be referred to by a guest OS is equivalent to a case when the logical sub-processor is set to an inactive state. In other words, it is the case when the logical sub-processor is no longer the object of assignment of the physical sub-processors.

Referring to FIG. 10, the guest OS 620 outputs to a system call processing unit 611 of the control OS 610 a system call requesting a save processing by which the context is stored from the guest OS to a position which can be referred to by the guest OS. When the system call processing unit 611 of the control OS 610 receives the system call from the guest OS 620, the system call processing unit 611 outputs to a logical sub-processor scheduling processing unit 612 a request of a change in the scheduling of a logical sub-processor and requests a context management unit 613 to store a context corresponding to a logical processor.

Upon the request thereof, the system call processing unit 611 shifts the state of the logical sub-processor from an active state to an inactive state. That is, the logical sub-processor associated with the logical partition set in the guest OS 620 is set aside from the object of assignment of the physical sub-processors. By performing this processing, the logical sub-processor is set to an inactive state.

Then the logical sub-processor scheduling processing unit 612 requests the context management unit 613 to perform a processing of storing a context corresponding to the logical sub-processor that has shifted to the inactive state. When a request to store/restore the context of a logical sub-processor is made by the logical sub-processor scheduling processing unit 612, the context management unit 613 executes to store/restore the context. When it is confirmed that this logical sub-processor has been set to the inactive state, a request to map a context table storing the context to a logical partition address space is sent out to a main memory management unit 614. The context to be stored includes the contents of a local storage in a logical processor, the contents of an MMIO and the contents of a register.

The main memory management unit 614 determines addresses, for context access, in a logical partition address space of the guest OS 620. The main memory management unit 614 maps the context to be stored in a main memory serving as a physical address space, in a logical partition address space area of the guest OS 620 and sets it to a state that can be referred to by the guest OS 620.

The guest OS can refer to a context according to an address notified, so that a resource based on the context, namely, an MMIO register or information on a local storage area can be obtained. Hence, reading and writing of information on these resources can be done.

Figure 11:
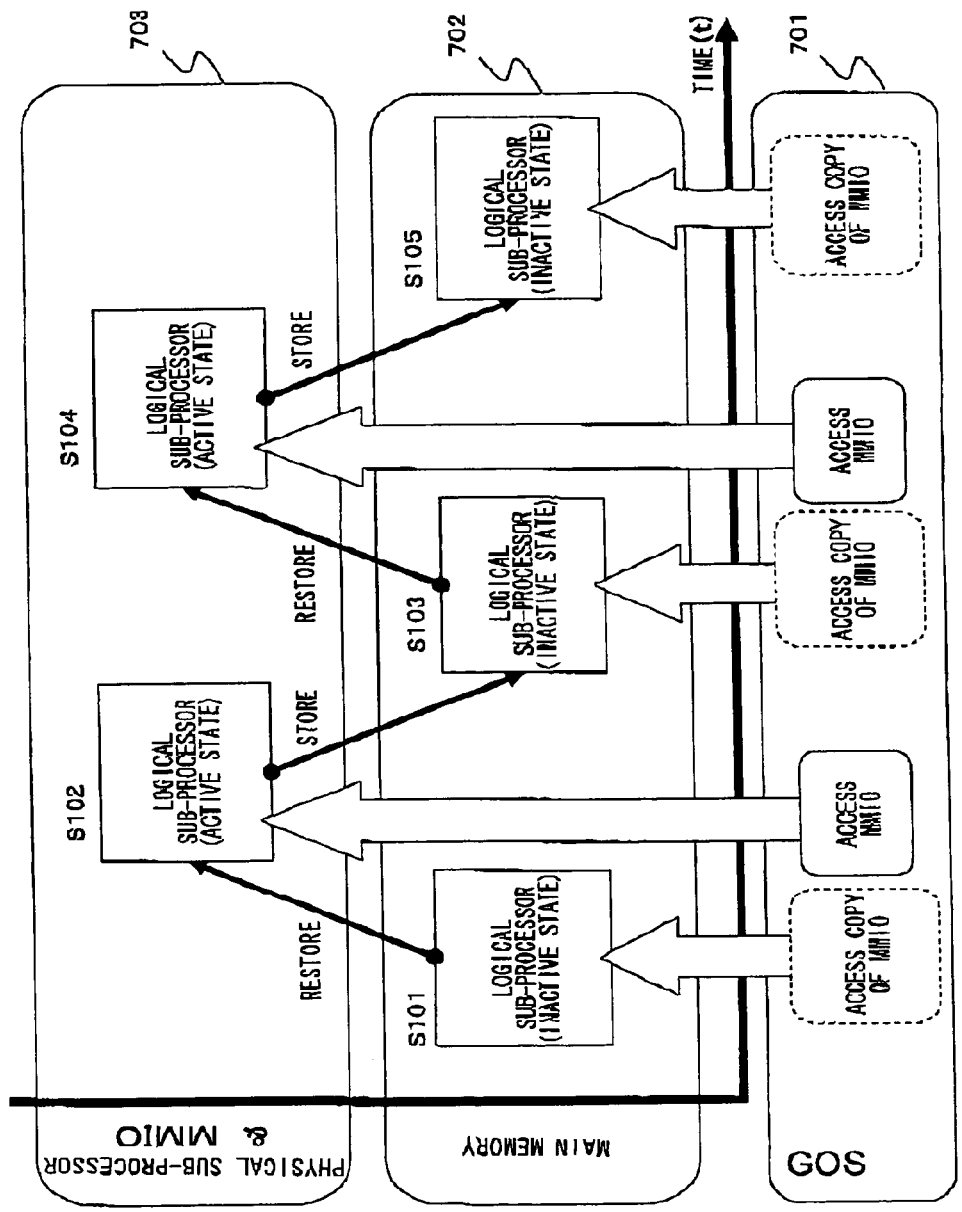
FIG. 11 illustrates a state transition of a guest OS and an MMIO access processing.

Referring to FIG. 11, a description will be given of a transition in access processing by use of MMIO registers when a guest OS to which a logical partition is set shifts from/to an active state to/from an inactive state. In FIG. 11, the state of a guest OS (GOS) 701 changes between an active state and an inactive state, by a control of a control OS based on a request from the guest OS. In FIG. 11 the horizontal axis denotes the time axis and time (t) elapses from left to right. S101 to S105 in FIG. 11 represent the slates of a guest OS; that is, state S101 is an inactive state, state S102 an active state, state S103 an inactive state, state S104 an active state and state S105 an inactive state.

When executing the access processing to hardware or the like by acquiring the MMIO register information, the guest OS 701 performs an access by use of the context table recorded in the main memory 702, namely, the copy information of MMIO register in a period during which the guest OS 701 is in the inactive states (S101, S103 and S105). On the other hand, when the guest OS 701 is in the active states (S102 and S104), the guest OS 701 executes the access processing in which the MMIO register information associated with a physical sub-processor 703 corresponding to a logical partition of a guest OS is directly used.

When the state of the guest OS 701 changes from an inactive state to an active state, a processing of restoring contexts is performed as described above. When the state of the guest OS 701 changes from an active state to an inactive state, a processing of storing contexts is performed as described above. The MMIO register information is contained in the contexts.

In this manner, a logical sub-processor associated with a guest OS can refer to the MMIO register information when the guest OS is both in an active state and in an inactive state.

Hence, the logical sub-processor can perform a processing of reading, writing and updating the resource information and the like.

However, there is still a problem to be considered concerning the setting that allows each guest OS to refer to all of the MMIO registers. For example, it is preferable that the control OS only can set and change a register by which a memory area is set to be accessible from a logical processor associated with each guest OS. And it is not desirable that such a register is accessed and altered by a guest OS and therefore such access must be prevented. Also, for a register by which system information such as on-board memory information is set, the access or change by a guest OS needs to be prevented.

Accordingly, a structure is required where the access to an MMIO register is enabled when the guest OS is both in an active state and an inactive state while the access to an MMIO register which may affect the processing by a control OS or the other guest OSs is not allowed.

As the control of access to an MMIO register, the following two ways (a) and (b) of controlling the access are possible.
(a) Access control per page (e.g., 4K bytes)
(b) Access control per bit
A description will be given of a control configuration for each access with reference to FIGS. 12 and 13.

Figure 12:
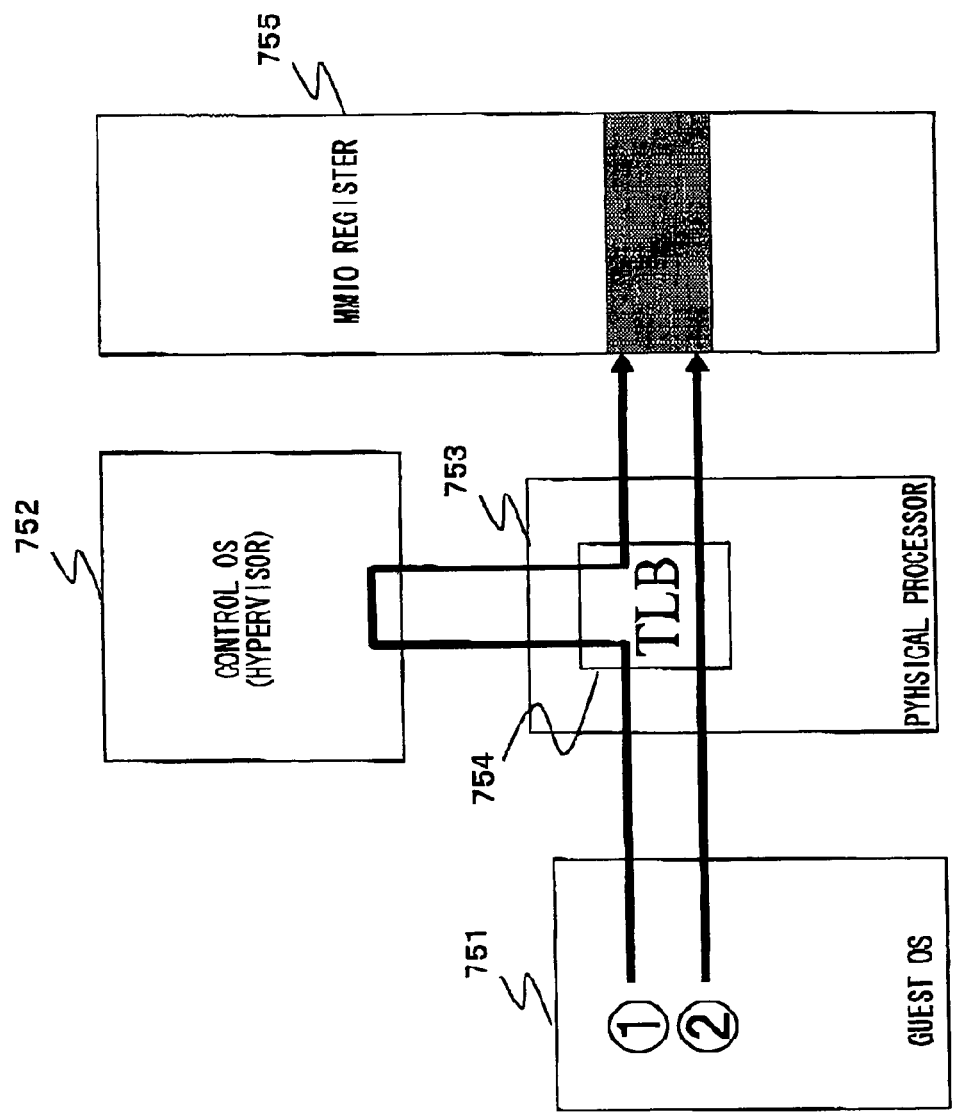
FIG. 12 illustrates an MMIO access processing by a guest OS.

FIG. 12 illustrates an access control configuration per page for an MMIO register. A guest OS 751 is accessing an MMIO register 755. A physical processor 753 that operates the guest OS 751 determines whether a request for access from the guest OS 751 is to be permitted or not. The access to the MMIO register 755 is executed only when it is permitted.

The physical processor 753 has a table information storage buffer 754 (hereinafter referred to as TLB 754 which stands for table lookaside buffer) which has registered the information, on whether or not access is permitted, in units of page (4K bytes, for instance) which is represented by a segmented region of the MMIO register 755. By referring to this TLB 754, the physical processor 753 determines if the position of a page requested to be accessed from the guest OS 751 is permitted or not, and it permits the access only if the requested page is an access-permitted page.

As for the information which has not been enrolled in the TLB 754, the physical processor 753 inquires of the control OS 752 that operates in the hypervisor mode about whether or not access is permitted and acquires from the control OS 752 the information on whether or not access is permitted. And the physical processor 753 determines whether the position of a page requested to be accessed from the quest OS 751 is an access-permitted page or not. Then the acquired information is enrolled in the TLB 754. As for the positions of pages enrolled in the TLB 754, whether or not access is permitted can be determined with only a processing of referring to the TLB 754 without the trouble of inquiring of the control OS 752, so that fast processing can be achieved.

Figure 13:
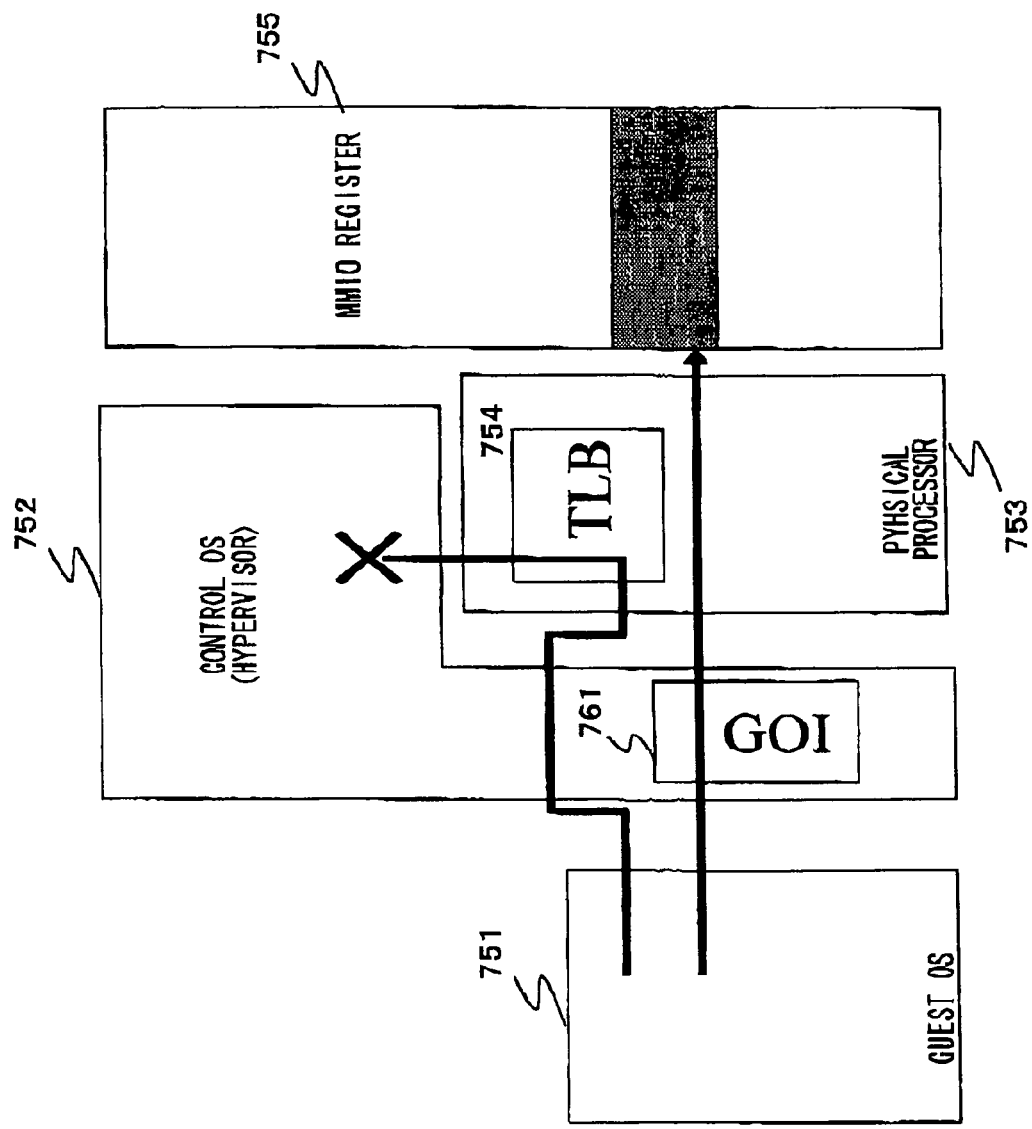
FIG. 13 illustrates an MMIO access processing by a guest OS through a guest OS programming interface (GOI).

By referring to FIG. 13, a description is now given of an access control arrangement in units of bit for an MMIO register. The access control in units of bit is carried out by use of a guest OS programming interface (GOI) 761. As already explained by referring to FIG. 5, the control OS 752, which operates in a hypervisor mode, provides a guest OS programming interface as an interface necessary for a variety of processings to be executed by the guest OS 751. It is possible to carry out access control for an MMIO register 755 by utilizing the guest OS programming interface (GOI) 761.

In a structure where MMIO register access using the guest OS programming interface (GOI) 761 only is permitted, a physical processor 753 will inquire of the control OS 752 about whether or not access is permitted even if an access request to the physical processor 753 is executed without passing through the GOI 761, but the control OS 752 will not permit the access because it has not been made through the GOI 761.

When the guest OS 751 executes an access request through the GOI 761, the control OS 752, which operates in a hypervisor mode, decides the accessibility or inaccessibility to the MMIO register 755 in bit units based on the information held by the control OS 752 and permits access by the guest OS 751 to MMIO register information that is in the access-permitted position only. This access control using the GOI has the merit of providing possibility of access control in bit units and therefore monitoring by a control OS, but it has the problem of increased processing load on the control OS.

By referring to FIG. 14, a description will be given of a context switching sequence in a setting for executing access control to MMIO register using a guest OS programming interface (GOI).

Figure 14:
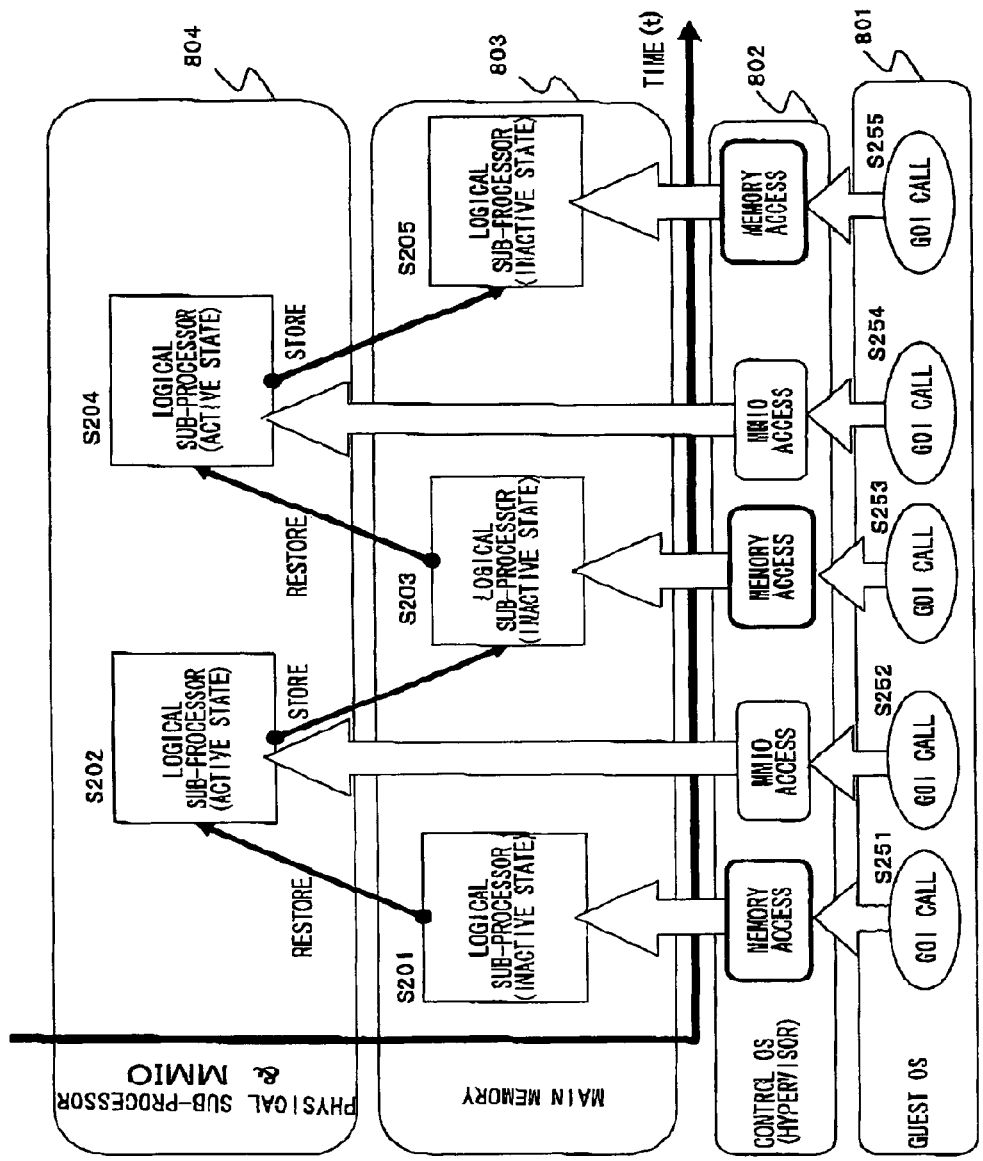
FIG. 14 illustrates a state transition of a guest OS and an MMIO access processing through a guest OS programming interface (GOI).

Similar to FIG. 11, in FIG. 14 time (t) elapses from left to right, and logical sub-processors S201 to S205 shift from/to an inactive state to/from an active state controlled by a control OS at the request from a guest OS. S201 to S205 in FIG. 14 represent the states of the guest OS 801; that is, state S201 is an inactive state, state S202 an active state, state S203 an inactive state, state S204 an active state, and state S205 an inactive state.

The guest OS 801 accesses the MMIO register using a guest OS programming interface (GOI), which was explained by referring to FIG. 13. In other words, the access to the MMIO register uses the guest OS programming interface (GOI) supplied by the control OS 802 operating in a hypervisor mode.

For example, the guest OS 801 in an inactive state at step S251 performs an MMIO register access based on a context table stored in the main memory 803 through the guest OS programming interface (GOI) supplied by the control OS 802. That is, an MMIO access is accomplished by memory access.

At step S252, instead of accessing the main memory 803, the guest OS 801 in an active state directly accesses the MMIO register by using the physical processor 804 associated with the logical partition corresponding to the guest OS 801 in the active state, through the guest OS programming interface (GOI) supplied by the control OS 802.

Further at step S253 and S255s, the MMIO register access by the guest OS 801 in an inactive state is realized by access to the main memory 803 through the guest OS programming interface (GOI) supplied by the control OS 802. And at step S254, direct access to the MMIO register is performed by using the physical processor 804 associated with the logical partition corresponding to the guest OS 801 in an active state.

However, access processing for an MMIO register corresponding to a physical processor takes more time than simple memory access processing. In other words, the access time (V) to the MMIO corresponding to a physical processor is much longer than the memory access time (W) (i.e., V>>W) and it is possible that the execution of MMIO access results in a delay in data processing.

In a processing sequence as shown in FIG. 14, an MMIO register access is accomplished at high speed when the guest OS 801 is in an inactive state, whereas, when the guest OS 801 is in an active state, the MMIO register access takes a longer time because it cannot be accomplished by access to the main memory 803.

Hence, in one preferred embodiment of the present invention, copy information of the MMIO register information is stored in the main memory 803 not only when the guest OS

801 is in an inactive state but also when it is in an active state. A description of the arrangement and processing according to this embodiment will be given below by referring to FIG. 15.

Figure 15:
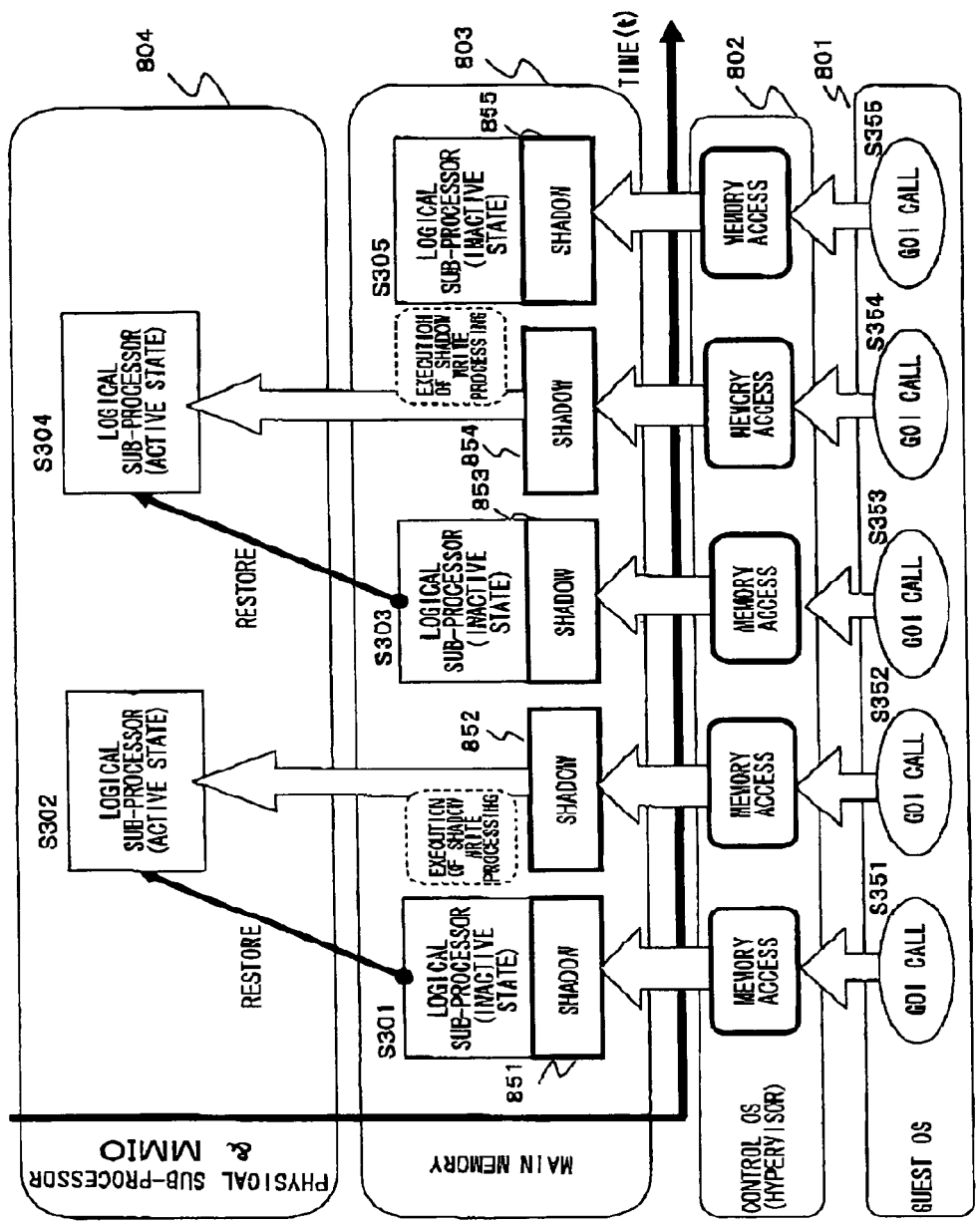
FIG. 15 illustrates a state transition of a guest OS with shadows being set in memory and an MMIO access processing through a guest OS programming interface (GOI).

Similar to FIG. 14, in FIG. 15 time (t) elapses from left to right, and logical sub-processors S301 to S305 shift from/to an inactive state to/from an active state controlled by a control OS at the request from a guest OS. In FIG. 15, state S301 is an inactive state, state S302 an active state, state S303 an inactive state, state S304 an active state, and state S305 an inactive state.

The guest OS 801 accesses the MMIO register using a guest OS programming interface (GOI) In other words, the access to the MMIO register uses the guest OS programming interface (GOI) supplied by the control OS 802 operating in a hypervisor mode.

In a processing arrangement as shown in FIG. 15, a "shadow" as copy information of the MMIO register information is stored in the main memory 803 not only when the guest OS 801 is in an inactive state but also when it is in an active state. Accordingly, the guest OS 801 can always perform access to the MMIO register as access to the main memory 803.

For example, at step S351, the guest OS 801 in an inactive state accesses an MMIO register information stored as shadow 951 in the main memory 803 through the guest OS programming interface (GOI) Supplied by the control OS 802. That is, an MMIO access is accomplished by memory access.

At step S352, the guest OS 801 in an active state accesses an MMIO register information stored as shadow 852 in the main memory 803 through the guest OS programming interface (GOI) supplied by the control OS 802. That is, an MMIO access is accomplished by memory access.

Further at step S353, S354, and S355, the MMIO register access by the guest OS 801 in either an inactive state or an active state is realized by access to the respective shadows 853 to 855 by access to the main memory 803 through the guest OS programming interface (GOI) supplied by the control OS 802.

Note that in this processing arrangement, when the guest OS 801 is in an active state and processing by a physical processor associated with the logical processor corresponding to the guest OS 801 is being executed, data processing using the MMIO register is executed by the physical processor and reading and writing of the MMIO register by the physical processor are executed by the data processing. A shadow stored in the main memory 802 is set as a copy of the MMIO register, so that it is not desirable any difference results between the actual MMIO register and the shadow.

Hence, when the guest OS 801 is in an active state, the control OS 802 operating in a hypervisor mode carries out an updating of a shadow according to the updated MMIO register information. Through this update processing of a shadow, the shadow set in the main memory 803 remains information in agreement with the content of the MMIO register.

It is to be noted that the shadow to be set in the main memory may be limited to information that is free from any rewriting by the physical processor. Or it may be so arranged that the shadow to be set in the main memory may be limited to information that allows the detection by the control OS 802 operating in a hypervisor mode of any rewriting by the physical processor, if it happens, in addition to information that is free from any rewriting by the physical processor. In a setting such as this, the guest OS is required to directly access the MMIO register via the physical processor if it is to obtain MMIO register information not included in the shadow set in the main memory.

Figure 16:
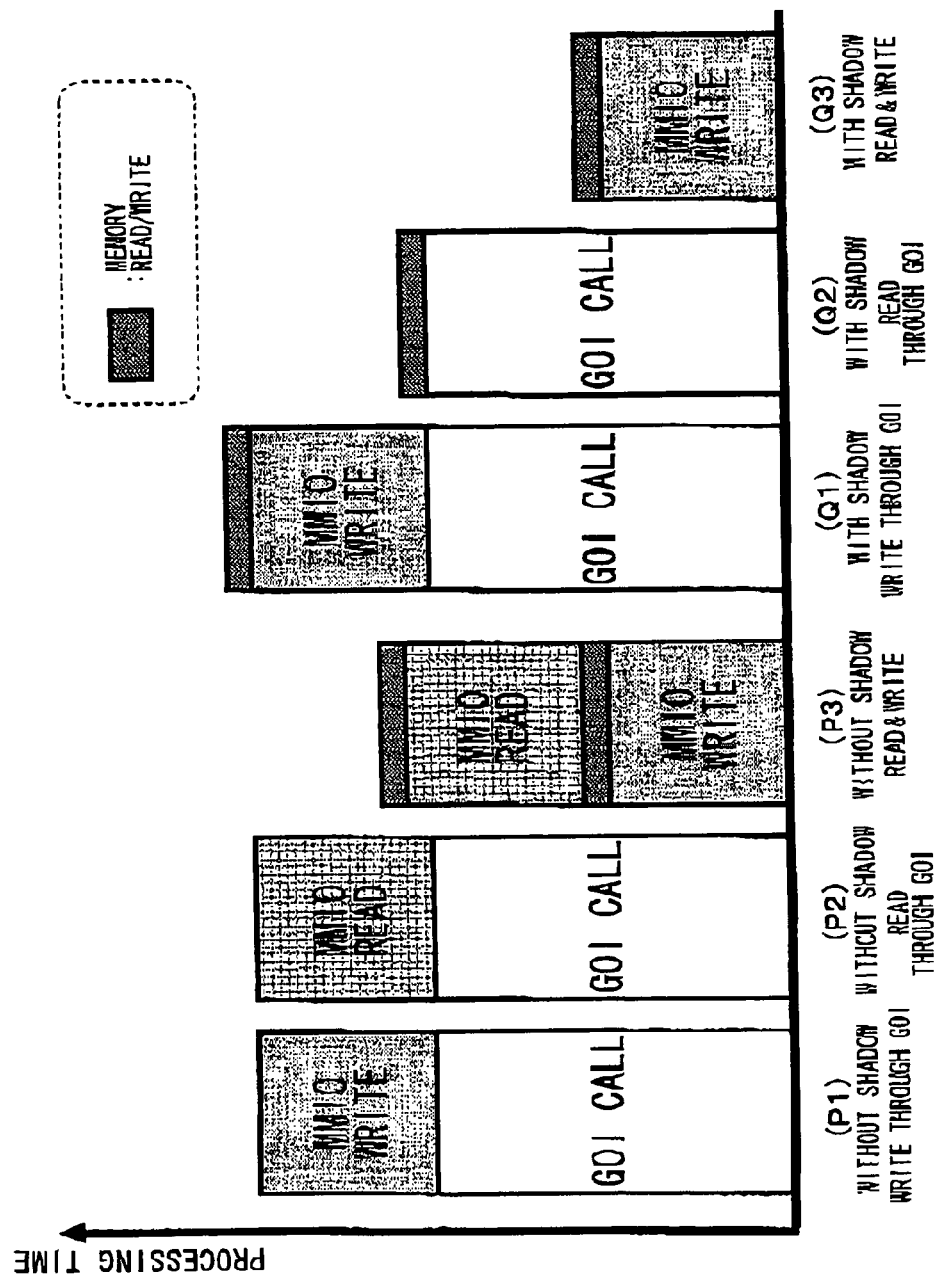
FIG. 16 shows MMIO access processing time to compare between a case when shadows are set in memory and a case when the shadows are not set.

By referring to FIG. 16, a description is given of the reduction of processing time, which can be realized by setting a shadow as copy information of the MMIO register in memory.

FIG. 16 shows processing time (represented by the vertical axis) when a "shadow" is not used ((P1) to (P3)) and when the shadow is used ((Q1) to (Q3)). More specifically, (P1): MMIO write processing through GOI in a structure without a shadow.

(P2): MMIO read processing through GOI in a structure without a shadow.

(P3): MMIO read and write processing in a structure without a shadow.

(Q1): MMIO write processing through GOI in a structure having a shadow.

(Q2): MMIO read processing through GOI in a structure having a shadow.

(Q3): MMIO read and write processing in a structure having a shadow.

In (P1), which is an "MMIO write processing through GOI in a shadow-less arrangement", the total of the call processing tine of the guest OS programming interface (GOI) supplied by the control OS and the MMIO register write processing time is the processing time for the guest OS. In the call processing of the guest OS programming interface (GOI), the guest OS carries out a system call to the control OS. In response to this system call, the control OS performs a processing to identify a logical sub-processor corresponding to the guest OS and set the guest OS programming interface (GOI) corresponding to the logical sub-processor in a way applicable to the guest OS.

In (P2), which is an "MMIO read processing through GOI in a shadow-less arrangement", the total of the call processing time of the guest OS programming interface (GOI) supplied by the control OS and the MMIO register read processing time is the processing time for the guest OS.

In (P3), which is an "MMIO read and write processing in a shadow-less arrangement", the processing is, for instance, carried out in a context switching processing to be executed at the switching between an active state and an inactive state. In this processing, the guest OS is assigned a physical processor and thus performs the write and read processing of MMIO register information directly, so that the processing time will be the total of the MMIO register read processing time, the MMIO register write processing time and the processing time for reading and writing of a context table stored in memory. It is to be noted here that, as mentioned previously, the access time (V) to the MMIO corresponding to a physical processor is much longer than the memory access time (W) (i.e., V>>W) and as a result, the memory access time taken in the reading and writing of a context table is far shorter than the MMIO read and write processing time.

(Q1) to (Q3) are the processing times in an arrangement where a shadow is set as explained by referring to FIG. 15, that is, the processing times when similar processings to (P1) to (P3) are executed.

In (Q1), which is an "MMIO write processing through GOI in a shadowed arrangement", the total of the call processing time of the guest OS programming interface (GOI) supplied by the control OS, the MMIO register write processing time and the shadow write processing time by memory access is the processing time for the guest OS In (Q2), which is an "MMIO read processing through GOI in a shadowed arrangement", copy information of the MMIO register is stored an a shadow in main memory, so that the guest OS performs a reading of the shadow set in memory instead of executing a reading of the MMIO register. Thus, the total of the call processing time of the guest OS programming interface (GOI) supplied by the control OS and the shadow read processing time by memory access is the processing time.

In (Q3), which is an "MMIO read and write processing in a shadowed arrangement", the processing is, for instance, carried out in a context switching processing to be executed at the switching between an active state and an inactive state, similar to the aforementioned processing of (P3). In this processing, copy information of the MMIO register is stored as a shadow in main memory, and therefore the guest OS performs a reading of the shadow set in memory instead of executing a reading of the MMIO register. Thus, the total of the memory access time and the MMIO register write processing time is the processing time.

The shadow-less processing (P1) to (P3) and the shadowed processing (Q1) to (Q3) as shown in FIG. 16 are compared with one another with respect to their processing time, and the following results are obtained.

P1≈Q1
P2>>Q2
P3>>Q3

From the difference between the processing times obtained as above, it is found that the structure having a shadow realizes a reduced total processing time than the structure without the shadow and can therefore achieve efficient data processing.

The present invention has been described above in detail with reference to specific embodiments. However, it is apparent to those skilled in the art that various modifications and replacements to the embodiments are possible within the scope of the present invention. That is, these embodiments are merely exemplary and shall not be interpreted in a limited way. Therefore, these and other variations upon the disclosed embodiments are intended to be covered by the present invention, which Is limited only by the appended claims.

A series of processings described in the patent specification can be realized in a variety of forms and structures such as by hardware only, software only or the combination thereof. In a case of processing by software, a program that has recorded processing sequences may be executed in a manner that the program is installed in memory embedded in dedicated hardware within a computer or the program is installed in a general-purpose computer capable of executing various processings.

For example, the program may be recorded in advance in a hard disk or ROM (Read Only Memory) as the recording medium. Or the program may be stored or recorded temporarily or permanently in a removable recording medium, such as a flexible disk, CD-POM (Compact Disc Read Only Memory), MO (Magneto-Optical) disk, DVD (Digital Versatile Disc), magnetic disk, or semiconductor memory. Such a removable recording medium may be provided as a so-called package software.

Note that the program may not only be installed in the computer from a removable recording medium as mentioned above, but also may be wirelessly transferred to the computer from a download site or may be transferred to the computer through wire using a network, such as LAN (Local Area Network) or Internet, so that the computer can receive the program and has it installed in a built-in recording medium, such as a hard disk.

Note that the various processings described in this patent specification may not only be executed time-sequentially along the description but also may be executed in parallel or independently according to the processing capacity of the processing execution units or as needed. Also, a system in this patent specification is a logical set of a plurality of units and is not limited to the constituent units placed within a single housing.

As described above, according to the embodiments of the present invention, data processing is carried out by associating a plurality of logical processors with physical processors by time sharing. In this arrangement, a control OS is so configured as to hold in memory a "shadow" as copy information of an MMIO register corresponding to a logical processor in either of the active state where a physical processor is assigned to a logical processor corresponding to a guest OS and the inactive state where a physical processor is not assigned to a logical processor. Hence, the guest OS can always access the MMIO register from the shadow by memory access, thus realizing access in a shorter time than direct access to the MMIO register. Therefore, the embodiments of the present invention realize efficient data processing.

While the preferred embodiments of the present invention have been described using specific terms, such description is for illustrative purposes only, and it is to be understood that changes and variations may be further made without departing from the spirit or scope of the appended claims

What is claimed is:

1. An information processing apparatus including:
a physical processor;
a memory;
a control OS execution unit that implements a control OS, the control OS performing a process of associating a plurality of logical processors with the physical processor through time-sharing; and
one or more guest OS execution units that each implement a respective guest OS, the respective guest OS assigned a designated logical processor among the plurality of logical processors,
wherein each of the guest OS execution units are configured to execute data processing such that a memory-mapped I/O (MMIO) register of the physical processor is used in an active state where the physical processor is allocated to the designated logical processor corresponding to the respective guest OS of each of the guest OS execution units,
wherein the control OS execution unit is configured to store in the memory copy information of the MMIO register corresponding to the designated logical processor corresponding to the respective guest OS of each of the guest OS execution units, both in the active state where the physical processor is allocated to said logical processor and in an inactive state where no physical processor is allocated to said logical processor,
wherein, both in the active state and inactive state of the designated logical processor corresponding to the respective guest OS, the guest OS execution unit reads data in the MMIO register by reading the data from the copy information stored in the memory without accessing the MMIO register via the control OS, and
wherein the guest OS execution unit is configured to access the copy information of the MMIO register stored in memory via a guest OS programming interface (GOI) set by the control OS.

2. An information processing apparatus according to claim 1, wherein the control OS execution unit is configured to store, in memory, a copy of MMIO register information, the MMIO register information not being rewritten by the physical processor.

3. An information processing apparatus according to claim 1, wherein the control OS execution unit is configured to store, in memory, a copy of MMIO register information, the MMIO register information not being rewritten by the physical processor; and the control OS execution unit is configure to store the copy of MMIO register information having been rewritten by the physical processor and being detected as being rewritten by the control OS.

4. An information processing apparatus according to claim 1, wherein the control OS execution unit is configured to update the copy information of MMIO register stored in memory in accordance with MMIO register information, when the rewrite of MMIO register information is executed by the physical processor.

5. An information processing apparatus according to claim 1, wherein the guest OS execution units are configured to execute a system call to the control OS upon a request of access to the copy information of MMIO register stored in memory, and
wherein the control OS execution unit is configured to set the guest OS programming interface (GOI) to the active state for the guest OS implemented by the guest OS execution unit.

6. A method of controlling a process in an information processing apparatus that executes data processing by associating a plurality of logical processors with a physical processor by time sharing, the method including:
executing, executed by a control OS, a processing of associating the plurality of logical processors, each logical processor corresponding to a guest OS, respectively, with the physical processor through time sharing;
executing a data process such that a memory-mapped I/0 (MMIO) register of the physical processor is used by a guest OS in an active state where the physical processor is allocated to a respective logical processor, among the plurality of logical processors, corresponding to the guest OS;
executing, by the control OS, a process such that copy information of the MMIO register corresponding to the respective logical processor corresponding to the guest OS, is stored in memory both in an active state where the physical processor is allocated to the respective logical processor and in an inactive state where no physical processor is allocated to the respective logical processor;
both in the active state and inactive state of the respective logical processor corresponding to the guest OS, reading, using the guest OS, data of the MMIO register by reading the data from the copy information stored in the memory without accessing the MMIO register via the control OS; and
configuring the guest OS to access the copy information of the MMIO register stored in memory via a guest OS programing interface (GIO) set by the control OS.

7. A process control method according to claim 6, a processing of storing in memory a copy of MMIO register information is executed by the control OS, the MMIO register information not being rewritten by the physical processor.

8. A process control method according to claim 6, wherein the control OS is configured to store, in memory, a copy of MMIO register information, the MMIO register information not being rewritten by the physical processor; and the control OS is configured to store the copy of MMIO register information having been rewritten by the physical processor and being detected as being rewritten by the control OS.

9. A process control method according to claim 6, wherein when a rewrite of MMIO register information is executed by the physical processor, a process of updating the copy information of MMIO register stored in memory in accordance with MMIO register information is executed by the control OS.

10. A process control method according to claim 6, wherein the guest OS executes a system call to the control OS upon a request of access to the copy information of MMIO register stored in memory, and
wherein the control OS executes a process of setting the guest OS programming interface (GOI) to the active state for the guest OS.

11. A non-transitory computer-readable storage medium with a computer program thereon, the computer program for use with an information processing apparatus that executes data processing by associating a plurality of logical processors with a physical processor through time-sharing, comprising:
a module for executing, by a control OS, a process of associating the plurality of logical processors, each logical processor corresponding to a guest OS, respectively, with the physical processor through time sharing;
a module for executing a data process such that a memory-mapped I/O (MMIO) register of the physical processor is used by a guest OS in an active state where the physical processor is allocated to a respective logical processor, among the plurality of logical processors, corresponding to the guest OS; and
a module for executing, by the control OS, a process such that copy information of the MMIO register corresponding to the respective logical processor corresponding to the guest OS is stored in memory both in an active state where the physical processor is allocated to the respective logical processor and in an inactive state where no physical processor is allocated to the respective logical processor,
wherein both in the active state and inactive state of the respective logical processor corresponding to the guest OS, reading, using the guest OS, data of the MMIO register is done by reading the data from the copy information stored in the memory without accessing the MMIO register via the control OS, and
wherein access to the copy information of the MMIO register stored in memory is obtained via a guest OS programming interface (GOI) set by the control OS.

* * * * *